United States Patent
Galmiche

(10) Patent No.: US 11,316,393 B2
(45) Date of Patent: Apr. 26, 2022

(54) MAGNETIC SHEET FOR ROTOR WITH A NON-THROUGH SHAFT, METHOD OF OBTAINING SUCH A SHEET AND ASSOCIATED ROTOR

(71) Applicant: GE Energy Power Conversion Technology Limited, Warwick (GB)

(72) Inventor: Christophe Galmiche, Toul (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 216 days.

(21) Appl. No.: 16/575,324

(22) Filed: Sep. 18, 2019

(65) Prior Publication Data

US 2020/0112213 A1   Apr. 9, 2020

(30) Foreign Application Priority Data

Sep. 19, 2018   (FR) ..................... 1858469

(51) Int. Cl.
*H02K 1/30* (2006.01)
*H02K 15/02* (2006.01)

(52) U.S. Cl.
CPC ............. *H02K 1/30* (2013.01); *H02K 15/02* (2013.01)

(58) Field of Classification Search
CPC ................. H02K 1/30; H02K 15/02
USPC ............ 310/216.004, 216.008, 216.011
See application file for complete search history.

(56) References Cited

U.S. PATENT DOCUMENTS

| 6,441,532 B1 * | 8/2002 | Ahrens | H02K 1/26 |
| | | | 310/211 |
| 2006/0163967 A1 * | 7/2006 | Yamamoto | H02K 29/03 |
| | | | 310/216.057 |

FOREIGN PATENT DOCUMENTS

| GB | 364027 A | * 12/1931 | ............... H02K 1/28 |
| GB | 523311 A | * 7/1940 | ............... H02K 1/28 |
| JP | 2006345657 A | * 12/2006 | |
| JP | 2015035918 A | * 2/2015 | |

* cited by examiner

*Primary Examiner* — Jose A Gonzalez Quinones
(74) *Attorney, Agent, or Firm* — Wood IP LLC

(57) ABSTRACT

The magnetic sheet for rotor with a non-through shaft with no recess at the center thereof is intended to be inserted between two half-shafts of the rotor. It comprises at least one locking means intended to cooperate with adjacent elements so as to prevent a relative movement of said sheet relative to the adjacent elements.

16 Claims, 21 Drawing Sheets

MAGNETIC SHEET FOR ROTOR WITH A NON-THROUGH SHAFT, METHOD OF OBTAINING SUCH A SHEET AND ASSOCIATED ROTOR

The present invention concerns rotary electric machines and relates more particularly to a locking device of magnetic sheets incorporated in a laminated rotor of the machine comprising a non-through shaft.

The present invention also relates to a rotary electric machine comprising such a rotor and a method of manufacturing magnetic sheets and such a rotor.

The laminated rotor of a rotary electric machine intended to operate at higher rotational speeds, particularly up to 300 m/s, comprises a non-through shaft such that the magnetic sheets of the rotor do not have a recess at their center in order to minimize the mechanical stresses which, in the case of a rotor comprising a through-shaft, are concentrated around the recess and are likely to damage the magnetic sheets.

Document EP 0609645 describes a laminated rotor comprising a non-through shaft for an asynchronous electric motor.

With reference to FIG. 1, represented is a cross-section of such a rotor 1 along an axial direction.

The rotor comprises two half-shafts 2 and 3 between which magnetic sheets 4 are inserted, held compacted by tie rods 5 connecting the two half-shafts 2 and 3.

The two half-shafts 2 and 3 comprise respectively short-circuit rings or discs 2a and 3a connecting conductive bars (not shown), for example made of copper, forming a squirrel cage.

Each magnetic sheet 4 comprises holes 4a in which the tie rods 5 are inserted.

Each metal sheet 4 is coated with a layer of insulating varnish 6 preventing electrical contact between adjacent sheets so as to minimize losses by Foucault current and to increase the performance of the motor.

The holes 4a are dimensioned in such a way that the tie rods 5 can be inserted into the holes 4a of all of the sheets 4 stacked during construction of the rotor and in such a way that a clearance remains in order to absorb the increased diameter of the tie rods from the effect of heat during operation of the rotor.

The magnetic sheets 4 are held together by shearing adhesion as a consequence of the compacting of the sheets, the presence of roughness on the surface of the magnetic sheets and the electrically insulating varnish.

However, during startup and stopping of the motor, it passes through a critical rotation speed corresponding to one of the eigenmodes of the rotor.

When the critical rotation speed is reached, the rotor flexes and vibrates.

Moreover, during operation of the motor, the rotor is subject to vibrations, shocks and thermal heating.

These phenomena are likely to cause radial slippage of the sheets, causing a radial clearance J between the magnetic sheets.

The two half-shafts are no longer coaxial as shown in FIG. 2, causing strong vibrations of the rotor that can result in an emergency shutdown, or even destruction of the rotor.

In order to limit the radial slippage of the magnetic sheets, the speed of rotation or the electrical power of the rotor is limited so that the temperature of the magnetic sheets does not exceed the glass transition temperature T1 of the insulating varnish.

With reference to FIG. 3, illustrated is the evolution of Young's modulus E of the insulating varnish as a function of the temperature T.

The characteristic of Young's modulus has a first range A extending in a temperature interval up to the glass transition temperature T1, and a second range B for temperatures T above the glass transition temperature T1.

Young's modulus decreases rapidly in the range B.

Consequently, the speed of rotation or the electrical power of the rotor is limited in such a way that the temperature of the rotor with non-through shaft is less than the glass transition temperature T1.

Moreover, the power of a rotary electric machine is proportional to its speed of rotation.

For a rotary electric machine of a given size, the greater the speed of rotation of the rotor, the greater the power developed by the machine.

The speed of rotation or the electrical power is limited by the value of the glass transition temperature T1.

Documents JPH 11220844 and JP 2009273202 describe methods of manufacturing a laminated stator the sheets of which comprise notches to maintain the sheets in relation to each other.

In document JP 2009273202 each magnetic sheet comprises several pieces of sheets. Each magnetic sheet is segmented.

Documents JP 2016096634, JP 2009195099, JP 2010119260 and U.S. Pat. No. 4,110,895 describe a laminated rotor each magnetic sheet of which comprises a recess at its center. The rotary shaft passes through all of the compacted magnetic sheets.

In document JP 2016096634, the magnetic sheets are stamped simultaneously to maintain the sheets in relation to each other and are clamped onto the shaft of the rotor.

In document JP 2009195099, each magnetic sheet is segmented. Each piece of magnetic sheet includes a notch to ensure its angular positioning relative to the adjacent segments.

Such a segmented rotor cannot withstand a peripheral speed of more than 150 m/s.

In document JP 2010119260, the magnetic sheets are turned down at their end in such a way as to fit into another sheet. The magnetic sheets are clamped onto the shaft.

In document U.S. Pat. No. 4,110,895, the magnetic sheets are bent at their end in such a way as to fit into another metal sheet.

In document US 2016329783, each magnetic sheet comprises tabs having notches for assembling sheets into a rotor. When the sheets have been assembled and bonded together, the tabs are removed from the sheets.

However, magnetic sheet holding devices known from the prior art are used to hold the sheets during the steps of assembling a laminated rotor or stator.

Furthermore, the magnetic sheets have a recess at their center, configured to receive a through-shaft.

It is therefore proposed to remedy the disadvantages related to a laminated rotor comprising a non-through shaft according to the prior art, particularly by preventing or limiting the radial slippage of the magnetic sheets in the rotor and by operating at rotor temperatures higher than the glass transition temperature of the varnish separating the adjacent magnetic sheets and lower than or equal to the maximum temperature given by the manufacturer of the varnish.

In view of the foregoing the invention proposes, according to one aspect, a magnetic sheet for a rotor with a non-through shaft with no recess at the center thereof and intended to be inserted between two half-shafts of the rotor.

The magnetic sheet comprises at least one locking means intended to cooperate with adjacent elements so as to prevent relative movement of said sheet relative to the adjacent elements.

According to a first embodiment, the locking means comprise a boss having a first face forming a cavity and a second face projecting from the magnetic sheet opposite to the first face, the first and second faces being capable of cooperating with the adjacent elements so that the second face of the locking means is inserted into a first adjacent element and a second adjacent element is inserted into the first face of the locking means.

According to a second embodiment, the locking means comprise at least one hole capable of cooperating with an adjacent element.

According to a third embodiment, the magnetic sheet comprises a central portion and a peripheral portion located on an outer periphery of the magnetic sheet, the locking means comprising the central portion and the peripheral portion, the central and peripheral portions forming an angle so that the peripheral portion cooperates with the peripheral portion of the adjacent elements so as to prevent a radial displacement of the magnetic sheet relative to the adjacent elements.

Advantageously, the magnetic sheet comprises at least two different locking means distributed uniformly over a diameter of the sheet.

Preferably, the locking means is circular, cylindrical, conical or substantially spherical, square, triangular, polygonal or oblong oriented so that the largest dimension is oriented along a radial direction or along a direction perpendicular to a radial direction.

According to another characteristic, the magnetic sheet further comprises circular retaining holes capable of receiving tie rods, the position of the retaining holes and of the locking means on the magnetic sheet is determined so that during assembly of magnetic sheets, each magnetic sheet from the same rolled roll is offset by a predetermined angle, for example an angle of 120°, preferably 90°.

According to another aspect, proposed is a rotor with a non-through shaft for rotary electric machine comprising a plurality of magnetic sheets such as previously defined, compacted between two half-shafts connected by tie rods, each sheet comprising the same number of locking means, each locking means of each of the magnetic sheets cooperating with or without clearance with adjacent elements so as to prevent a relative displacement of said sheet relative to the adjacent elements and so as to prevent a relative displacement of each of the sheets relative to the adjacent elements.

According to one characteristic, the adjacent element comprises a magnetic sheet, a half-shaft or a short-circuit disc comprising locking means cooperating with the locking means of the magnetic sheet in such a way that the magnetic sheets are immobilized along a radial and/or tangential direction of the rotor.

Advantageously, at least one half-shaft comprises a central portion comprising at the center thereof a blind hole, a counterbore or a cavity of angled conical shape.

According to still another aspect, proposed is a rotary electric machine comprising a rotor as previously defined.

According to still another aspect, proposed is a method of obtaining a magnetic sheet for a rotor or between two short-circuit discs with a non-through shaft with no recess at the center thereof and intended to be inserted between two half-shafts of the rotor.

At least one locking means is produced intended to cooperate with adjacent elements so as to prevent a relative movement of said sheet relative to the adjacent elements.

According to one characteristic, locking means are produced comprising a boss having a first face forming a cavity and a second face projecting from the magnetic sheet opposite to the first face, the first and second faces being capable of cooperating with adjacent elements so that the second face of the locking means is inserted into a first adjacent element and a second adjacent element is inserted into the first face of the locking means.

Preferably, the boss is produced by punching, preferably on substantially a half-thickness of the sheet.

Advantageously, the boss is produced by stamping preferably on substantially at least one time the thickness of the magnetic sheet, preferably on substantially two to three times the thickness of the sheet.

According to another characteristic, the magnetic sheet is bent so as to form a central portion and a peripheral portion located on an outer periphery of the magnetic sheet, the locking means comprising the central portion and the peripheral portion forming an angle so that the peripheral portion cooperates with the peripheral portion of the adjacent elements so as to prevent a radial displacement of the magnetic sheet relative to the adjacent elements.

Preferably, the locking means are produced when the magnetic sheet is inserted and compacted between two half-shafts or between two short-circuit discs which are in turn compacted between the half-shafts.

Advantageously, the locking means are partially produced by preforming in the magnetic sheet, in which the shape and final dimensions of the locking means are produced during a compacting step when the magnetic sheet is inserted between two half-shafts or between two short circuit-discs compacted between two half-shafts.

According to still another aspect, proposed is a method of obtaining a rotor with a non-through shaft for a rotary electric machine, wherein a plurality of magnetic sheets as previously defined are inserted between two half-shafts or two short-circuit discs in such a way that the locking means of each magnetic sheet cooperate with adjacent elements so as to immobilize the magnetic sheet along a radial and/or tangential direction relative to the adjacent elements.

Advantageously, tie rods are inserted passing through the retaining holes of each of the magnetic sheets and connecting the two half-shafts in such a way that the magnetic sheets are held compacted between the two half-shafts.

Other characteristics and advantages of the invention will emerge on reading the following description of embodiments of the invention, provided solely by way of non-limiting examples and with reference to the drawings in which:

FIGS. 1 and 2, which have already been mentioned, illustrate a rotor comprising a non-through shaft of a rotary electric machine according to the prior art;

FIG. 3, which has already been mentioned, illustrates the evolution of Young's modulus of an insulating varnish of the magnetic sheets as a function of the temperature of the rotor;

Figure 1:
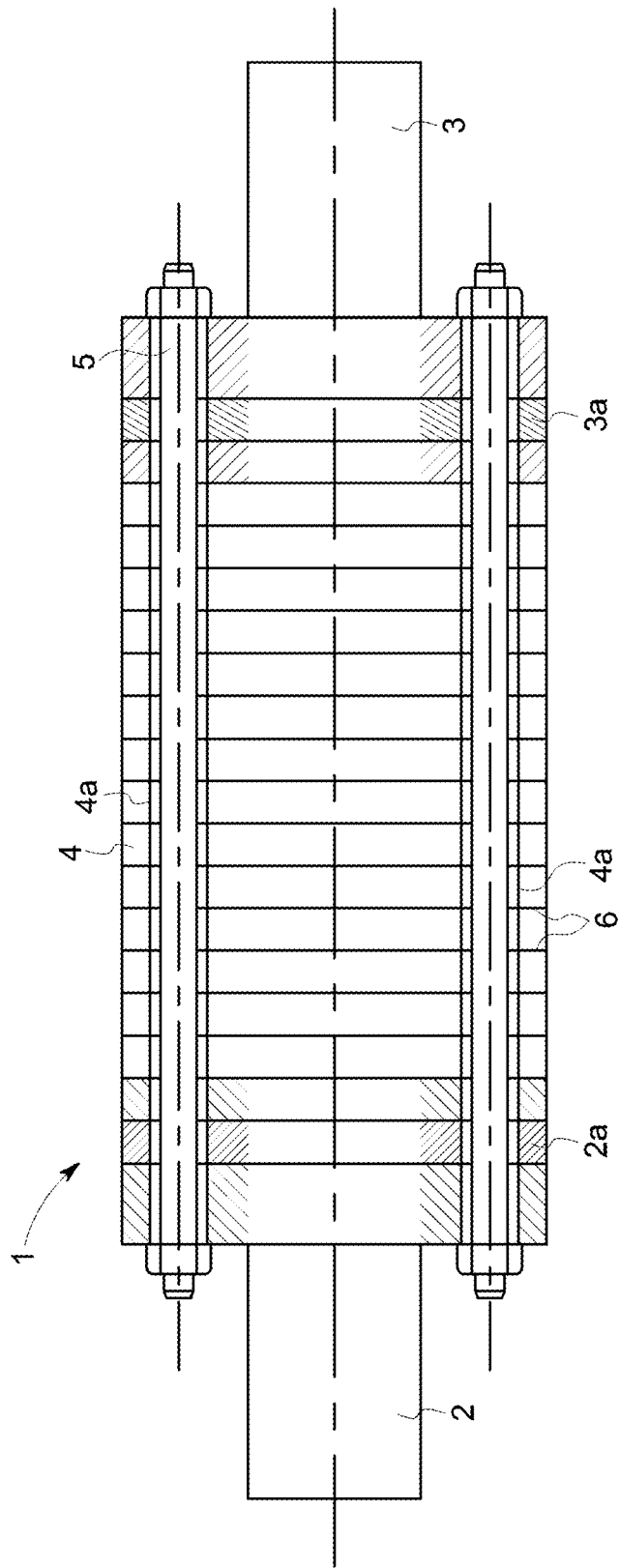
Figure 2:
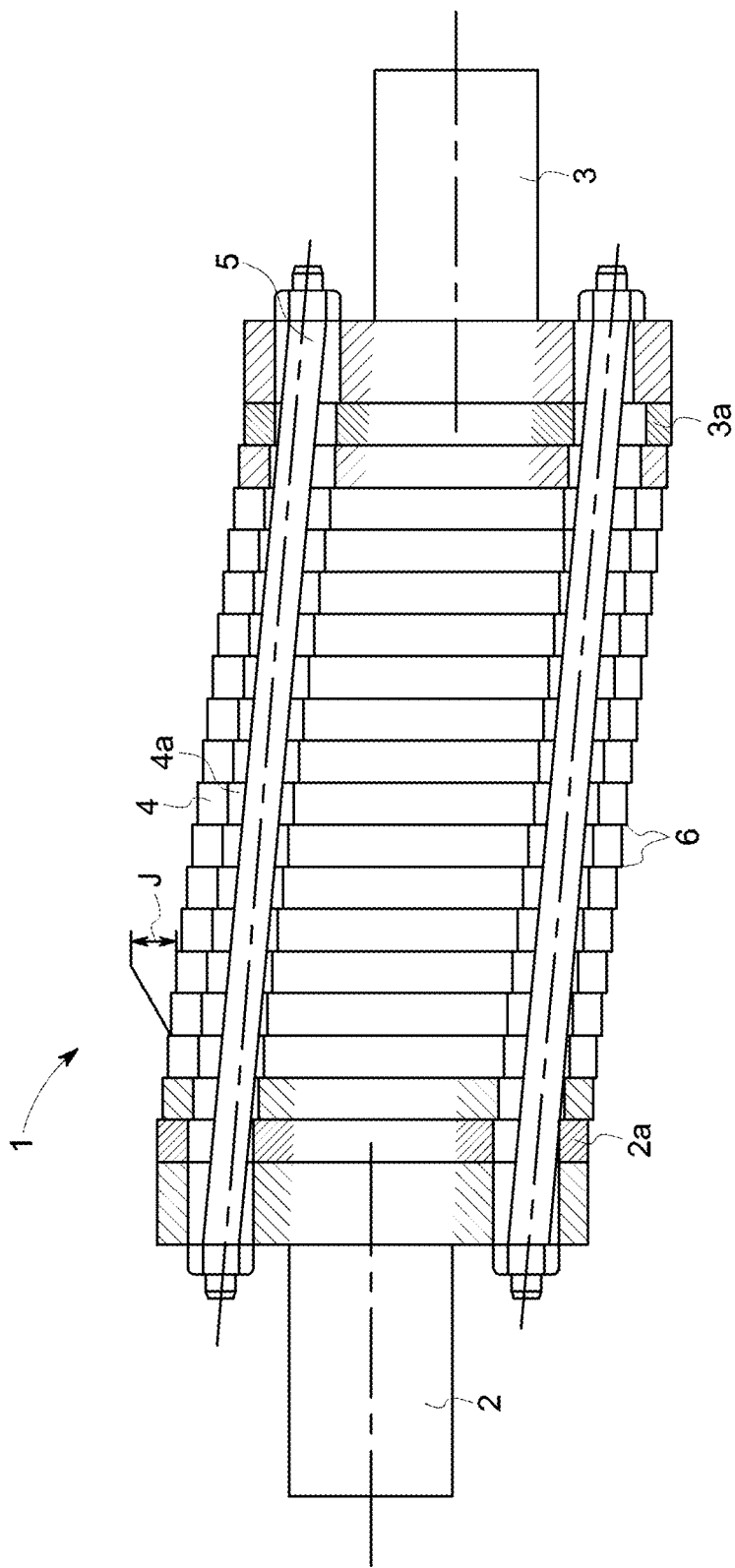
Figure 3:
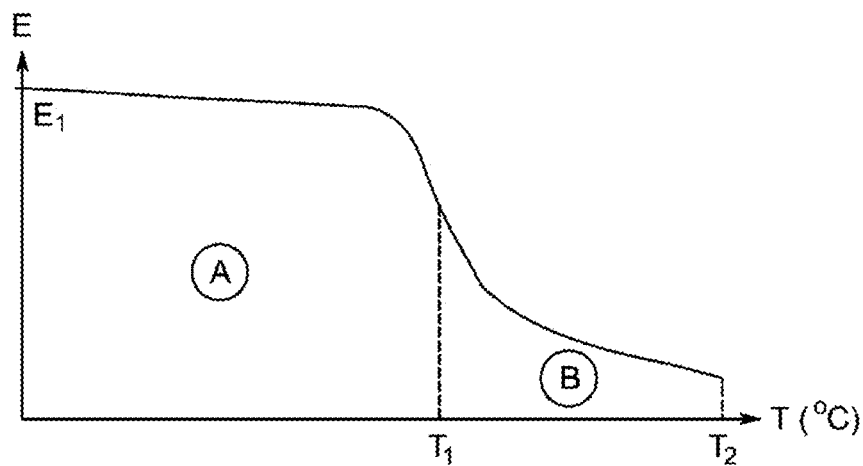
Figure 4:
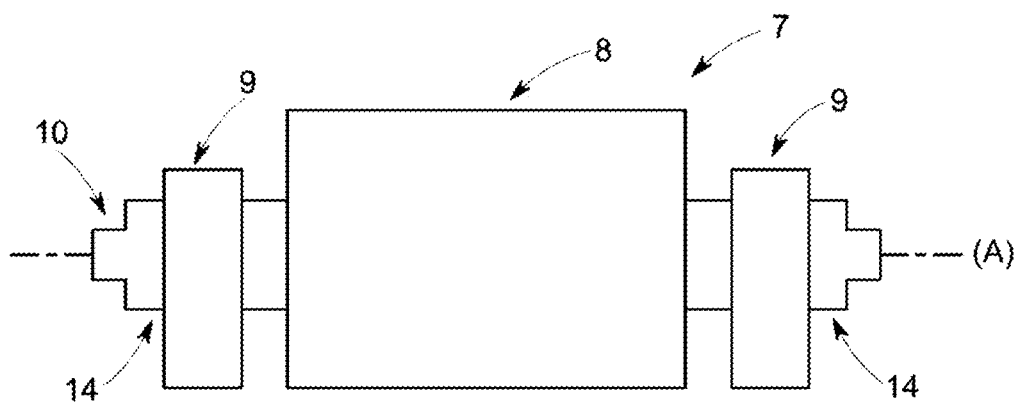
FIG. 4 illustrates an embodiment of a rotary electric machine.

With reference to FIG. 4, illustrated is an embodiment of a rotary electric machine 7 comprising a stator 8, bearings 9 and a rotor 10 inserted into the stator 8 and bearings 9.

The rotor 10 comprises a non-through rotor shaft comprising two half-shafts 14 and a centerline (A) that coincides with the axis of rotation of the rotor 10.

Figure 5:
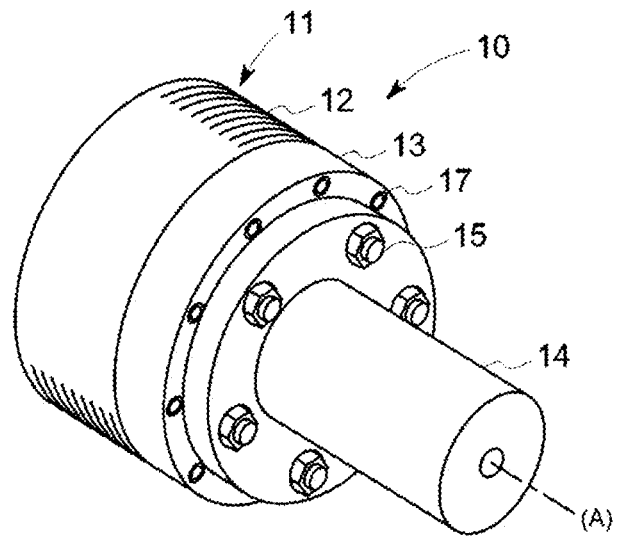
FIG. 5 illustrates a portion of a laminated rotor for an asynchronous rotary electric machine.

With reference to FIG. 5, illustrated is a portion of a laminated rotor 10 for an asynchronous rotary electric machine.

The rotor comprises a magnetic circuit 11 comprising magnetic sheets 12 compacted between two short-circuit discs (one short-circuit disc 13 is shown) held between the two half-shafts (one half-shaft 14 is shown).

The rotor 10 further comprises tie rods 15 connecting the half-shafts 14 in such a way that the magnetic sheets 12 are held compacted together.

Each magnetic sheet 12 comprises circular retaining holes 16 (not shown) distributed uniformly over a diameter of the sheet in such a way that a tie rod 15 connecting the two half-shafts passes through a retaining hole.

The rotor 10 further comprises conductive metal bars 17 inserted into the support holes 18 (not shown) distributed uniformly over a diameter of the sheet in such a way that the bars 17 and short-circuit discs 13 form a squirrel cage.

Each magnetic sheet 12 is coated with an electrically insulating varnish and does not include any central recess.

According to another embodiment, the laminated rotor can comprise rotor windings inserted into receptacles formed by the magnetic sheets. In this embodiment, the rotor does not include short-circuit discs and the support holes 18 are replaced by enclosures configured to receive the rotor windings.

The laminated rotor according to this embodiment is incorporated in a synchronous rotary electric machine.

The laminated rotor comprising the rotor windings is incorporated in an asynchronous wound-rotor rotary electric machine.

The short-circuiting of the winding is achieved outside the magnetic circuit 11, in an electrical supply device of the wound rotor.

Figure 6:
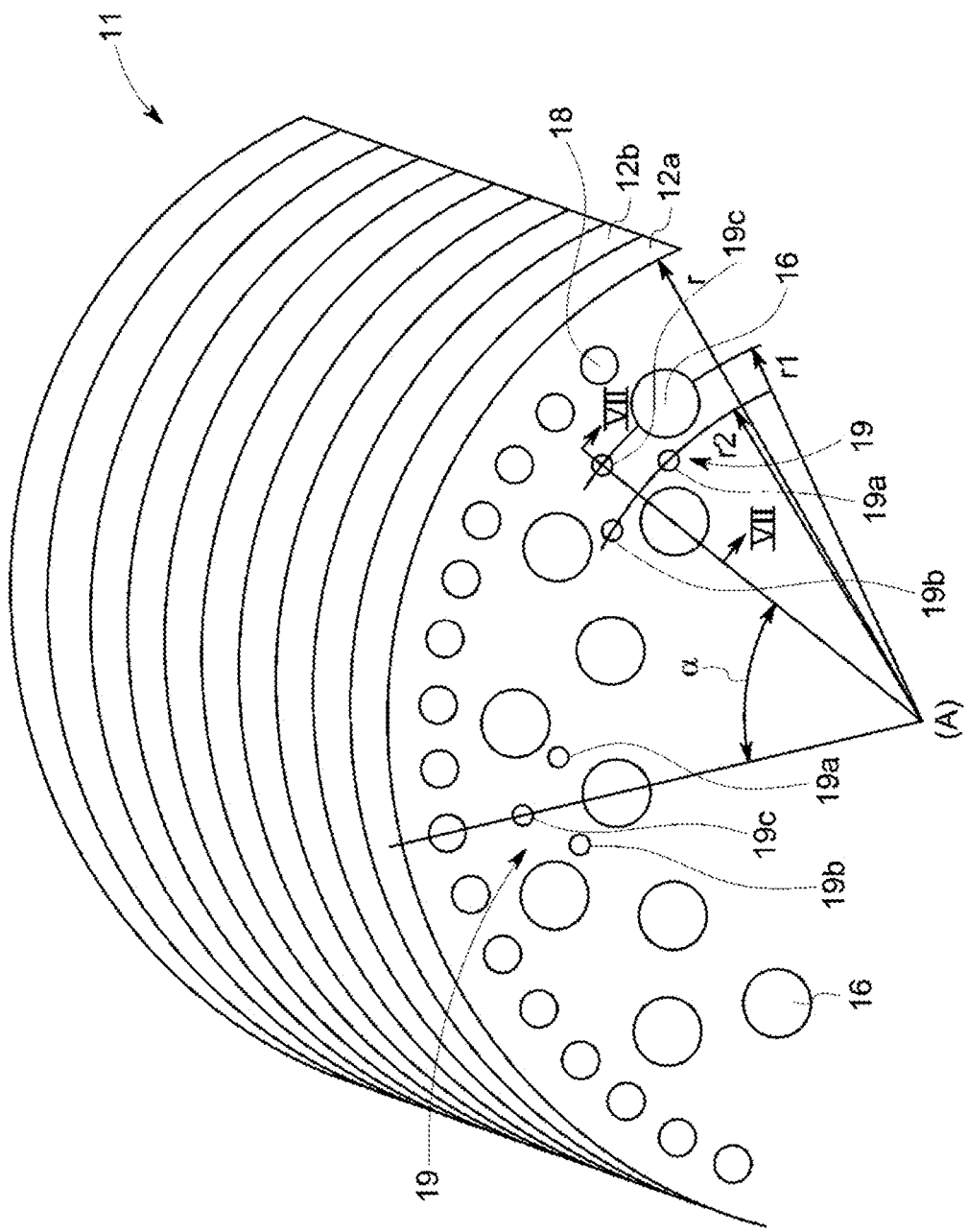
FIG. 6 illustrates a partial view of one embodiment of the magnetic circuit.

With reference to FIG. 6, illustrated is a partial view of one embodiment of the magnetic circuit 11.

The magnetic circuit 11 comprises a plurality of magnetic sheets identical to the sheets 12, particularly magnetic sheets referenced 12a and 12b.

Each magnetic sheet 12, 12a and 12b further comprises locking means 19 intended to cooperate with adjacent elements so as to prevent displacement of said sheet relative to the adjacent elements.

Depending on the position of the magnetic sheet 12, 12a and 12b in the magnetic circuit 11, the adjacent elements comprise other magnetic sheets 12 or a magnetic sheet 12 and a short-circuit disc 13 or a magnetic sheet 12 and a half-shaft 14.

In order to compensate for the thickness defects of the magnetic sheets 12, 12a and 12b caused by the rolling of the magnetic sheets, known by the term rolled edges, the position of the retaining holes 16, support holes 18 and locking means 19 is determined in such a way that during assembly of the magnetic circuit 11, each magnetic sheet 12 from the same rolled roll is offset by a predetermined angle, for example an angle of 120°, preferably 90°.

The number of locking means on each magnetic sheet 12 is determined in such a way as to limit or prevent a radial displacement of the sheet 12 in the magnetic circuit 11.

The locking means 19 are distributed uniformly over the whole surface of the magnetic sheet 12, 12a and 12b.

Each magnetic sheet 12 has a radius of value r.

The locking means 19 comprise, for example, locking means 19a, 19b and 19c forming a pattern. The pattern is repeated over the surface of the magnetic sheet according to an angle α oriented in an axial direction and the locking means 19a, 19b and 19c are located respectively at a radial distance r2 and r1 from the center of the circular sheet 12.

The value of the angle α is equal to the value of the predetermined angle of offset of the magnetic sheets, i.e. a multiple of the angle between each retaining hole 16 and each support hole 18.

The value of the radii r1 and r2 is determined in such a way that it is close to the value of the radius r of the magnetic sheet while allowing the insertion of retaining holes 16, support holes 18 in the sheet 12, and so as to prevent the radial or tangential displacement of the sheets 12.

The locking means 19a, 19b and 19c cooperate with locking means 19d, 19e and 19f disposed on the magnetic sheet referenced 12b.

Figure 7:
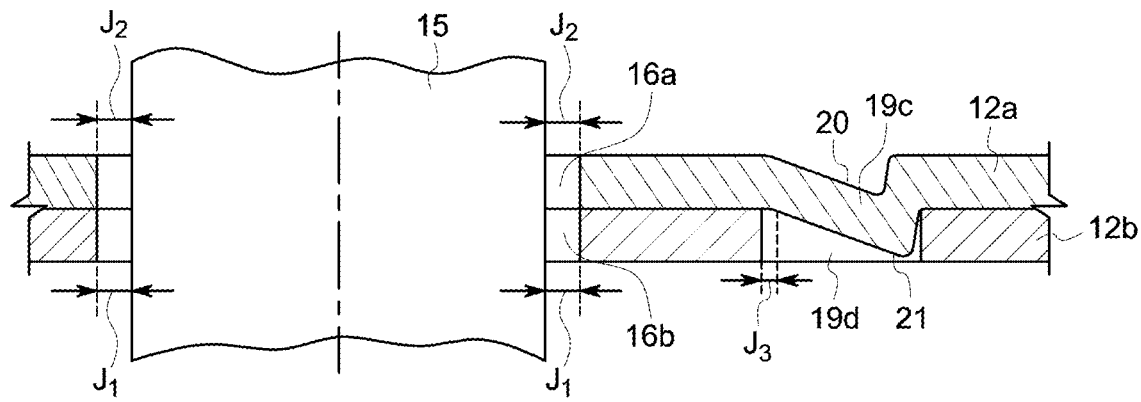
FIG. 7 shows a first embodiment of means for locking magnetic sheets.

Reference is now made to FIG. 7, which represents a partial cross-section of the magnetic sheets referenced 12a and 12b comprising a first embodiment of the locking means, along section plane (VII-VII).

The tie rod 15 can be seen, inserted into the retaining holes 16a and 16b of the sheets 12a and 12b.

The tie rod 15 is separated from the edge of the retaining holes 16a and 16b respectively by clearances J1 and J2 so that during the variation of the diameter of the tie rod 15 from the effect of heat, or so that during insertion of the tie rod 15 into the magnetic circuit 11 during construction of the magnetic circuit.

The tie rod 15 does not fit in contact with the edge of the retaining holes.

The locking means 19c of the magnetic sheet 12a includes a boss having a first face 20 forming a cavity and a second face 21 projecting from the magnetic sheet opposite to the first face.

The locking means 19d of the magnetic sheet 12b comprise a hole cooperating with the boss in such a way that the second face 21 is inserted into the hole.

The hole and the boss are dimensioned in such a way that a clearance J3 separates a first side of the second face from the edge of the hole, the second side of the second face being in contact with the edge of the hole.

The value of the clearance J3 separating the boss from the hole is less than the value of the clearances J1, J2 separating the tie rod from the retaining holes enabling the insertion of the tie rod 15 into the magnetic circuit 11 or the variation of the diameter of the tie rod 15 from the effect of heat, and allowing a more precise positioning and locking of the adjacent sheets 12a and 12b.

According to another embodiment, when the value of the clearance J3 is set, the value of the clearances J1, J2 is reduced in order to minimize the mechanical stresses undergone by the tie rod 15 from the effect of centrifugal force moving the tie rod in a radial direction when the rotor is driven in a rotational movement.

The hole and the boss can for example be circular, cylindrical, conical or substantially spherical in shape. The shapes of the hole and boss are selected in such a way that each boss cooperates with a hole.

The bosses and the holes are disposed on each of the magnetic sheets inserted into the magnetic circuit 11 in such a way that the magnetic sheets are displaced in a radial direction relative to each other by a maximum distance equal to the clearance J3 separating the first side of each boss from the edge of a hole.

The locking means 19a and 19b of the magnetic sheet 12a can for example each comprise a boss cooperating with a hole of the locking means 19e and 19f of the magnetic sheet 12b.

The boss is obtained by stamping the magnetic sheet 12a and the hole is obtained for example by punching the magnetic sheet 12b.

Figure 8:
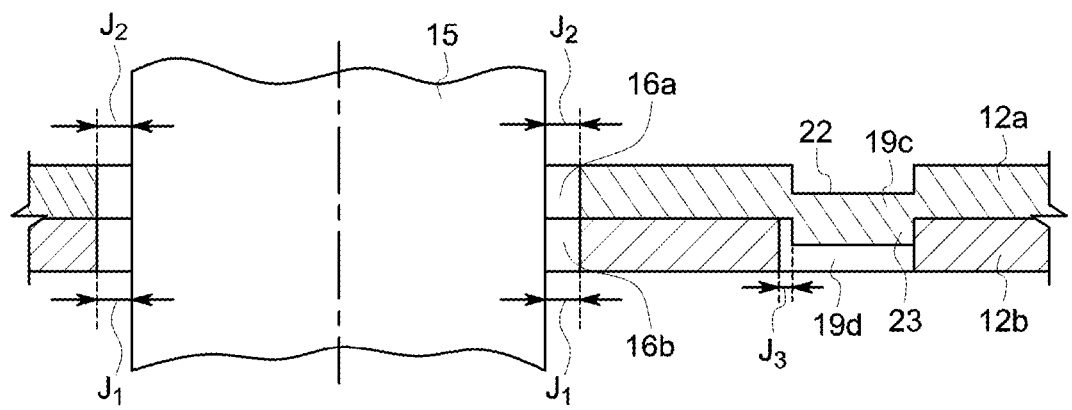
FIG. 8 shows a second embodiment of means for locking magnetic sheets.

Reference is now made to FIG. 8, which represents a partial cross-section of the magnetic sheets referenced 12a and 12b comprising a second embodiment of the locking means, along section plane (VII-VII).

The tie rod 15 is inserted into the retaining holes 16a and 16b of the sheets 12a and 12b, the clearances J1, J2 and J3, and the locking means 19d comprising a hole in the magnetic sheet 12b.

The locking means 19c of the magnetic sheet 12a includes a boss having a first face 22 forming a cavity and a second face 23 projecting from the magnetic sheet opposite to the first face.

The second face 23 and the hole cooperate in such a way that the second face is inserted into the hole and the clearance J3 separates a first side of the second face of the boss from the edge of the hole, the second side of the second face of the boss being in contact with the edge of the hole.

In this embodiment, the boss is obtained by punching the magnetic sheets and the hole is obtained for example by punching.

Figure 9:
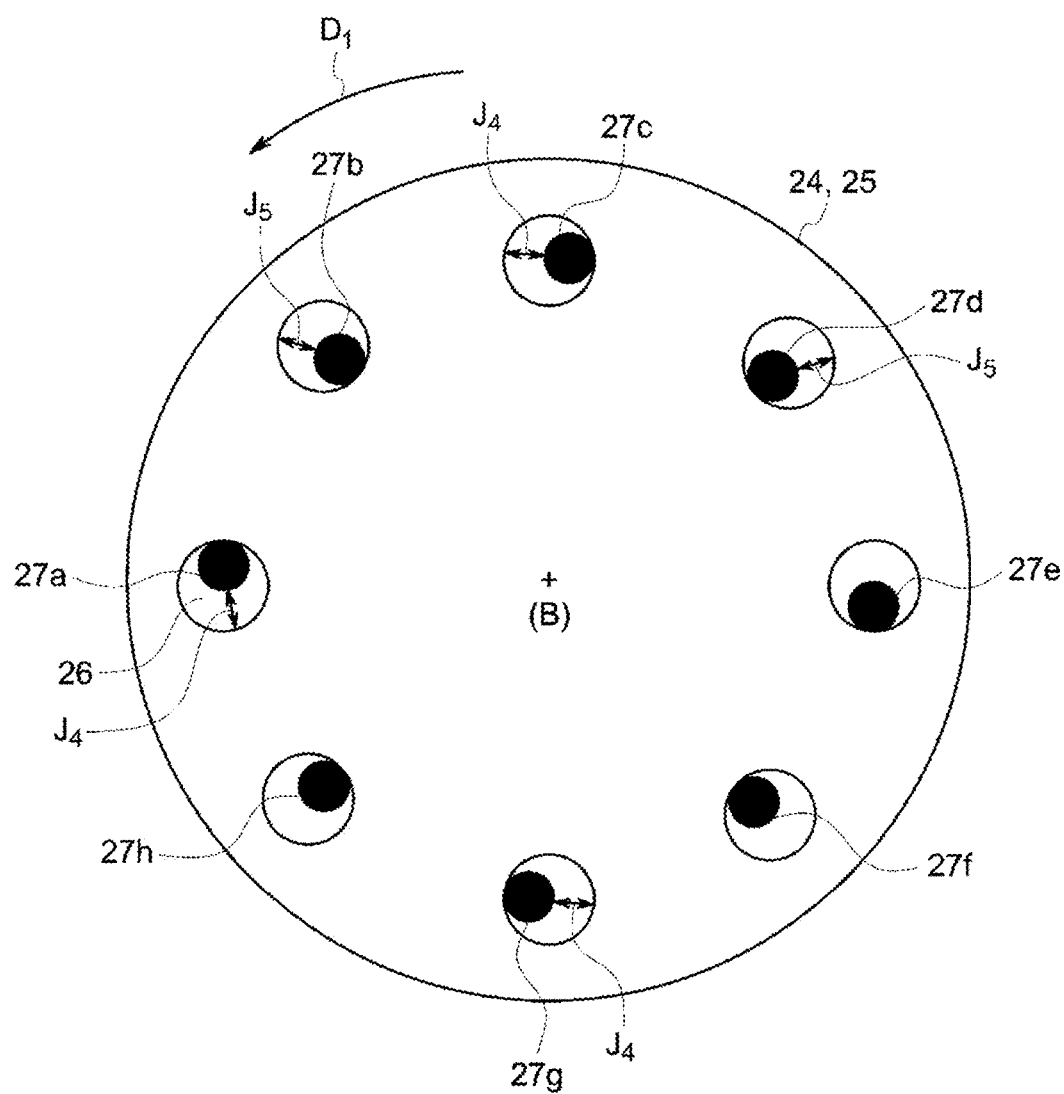
FIGS. 9 and 10 show exemplary arrangements of locking means on magnetic sheets.
Figure 10:
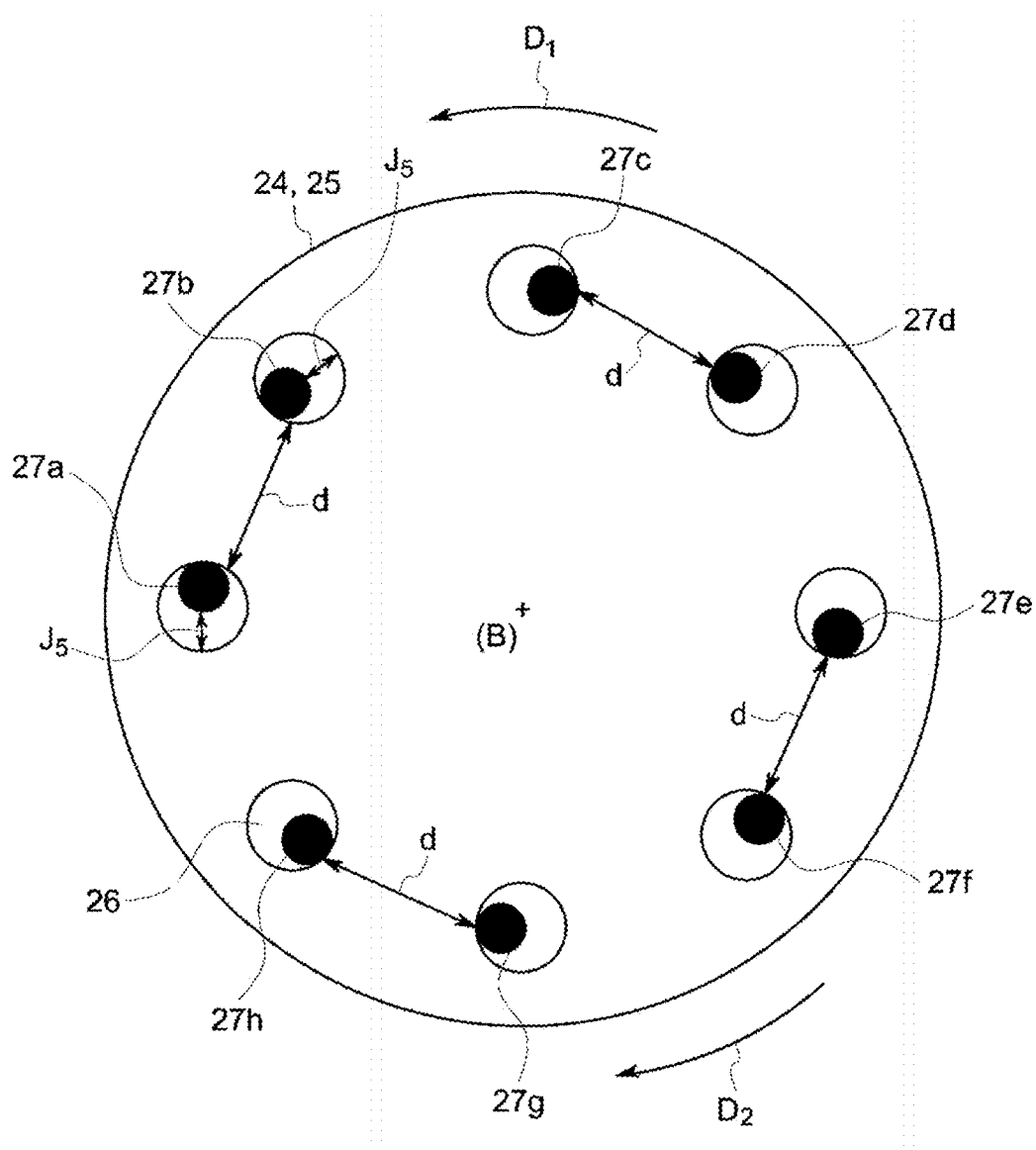

Reference is now made to FIGS. 9 and 10, which illustrate two exemplary layouts of the locking means previously described on magnetic sheets comprising a centerline (B) that coincides with the axis of rotation of the rotor integrating said sheets.

In order to clarify the explanations, only two magnetic sheets 24 and 25 are shown. All the magnetic sheets comprise locking means.

The magnetic sheets 24 and 25 are superimposed one upon the other.

The first sheet 24 comprises holes 26 that are all identical, cooperating with bosses—circular, for example—27a, 27b, 27c, 27d, 27e, 27f, 27g and 27h that are all identical, as previously defined.

Particular reference is made to FIG. 9.

A first portion of the surface of the bosses 27a, 27c, 27e and 27g is in contact with the edge of a circular hole 26 and a second portion of the surface of the bosses is separated from the edge of the holes 26 by a clearance J4 oriented in a direction perpendicular to a radial direction.

A first portion of the surface of the bosses 27b, 27d, 27f and 27h is in contact with the edge of a hole 26 and a second portion of the surface of the bosses is separated from the edge of the holes 26 by a clearance J5 oriented in a direction parallel to a radial direction.

Advantageously, the bosses 27a, 27c, 27e and 27g maintain the magnetic sheets 24 and 25 immobilized together from the effect of the torque when the rotor is rotating in the counterclockwise direction D1, and the bosses 27b, 27d, 27f and 27h maintain the magnetic sheets 24 and 25 immobilized together when the rotor is subject to shocks or vibrations directed in a radial direction.

FIG. 10 illustrates the bosses 27a, 27b, 27c, 27d, 27e, 27f, 27g and 27h inserted in the holes 26 in such a way that the first portion of each boss is in contact with a hole 26, a distance d separating the first portion of two adjacent bosses is the smallest achievable, and the clearance J5 in a direction perpendicular to a radial direction separates the second portion of each boss from the edge of the hole 26.

Advantageously, the bosses 27a, 27b, 27c, 27d, 27e, 27f, 27g and 27h maintain the magnetic sheets 24 and 25 immobilized together under the effect of the torque when the rotor is rotating in the counterclockwise D1 and clockwise D2 direction.

According to another embodiment, the orientations of the bosses in the holes described previously are combined in order to immobilize the sheets relative to each other when they are subjected to a shock and/or a rotational movement in the counterclockwise or clockwise direction.

Figure 11:
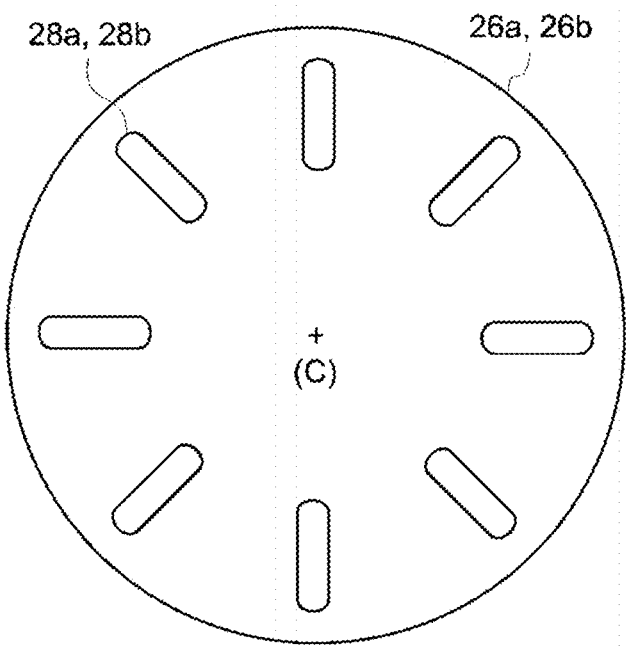
FIGS. 11 and 12 show exemplary embodiments of magnetic sheets comprising oblong holes.
Figure 12:
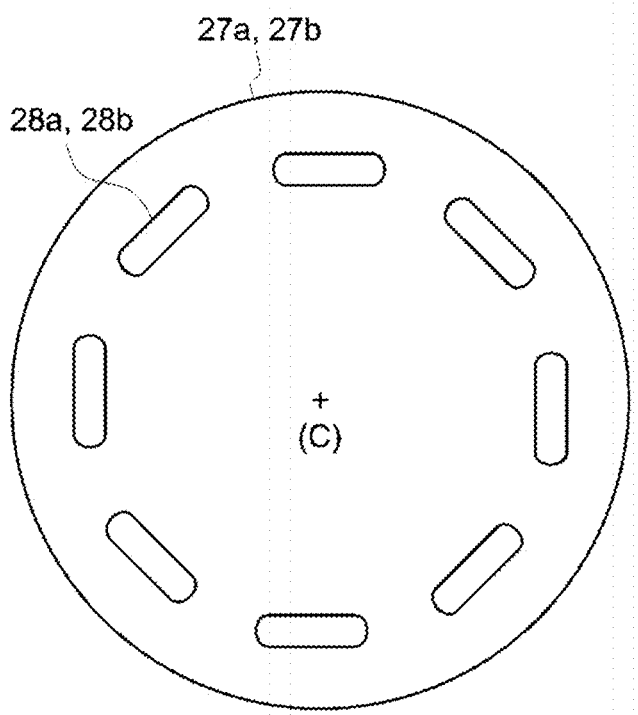

FIGS. 11 and 12 show exemplary embodiments of magnetic sheets 26a and 27a comprising oblong holes 28a and adjacent sheets 26b and 27b comprising oblong bosses 28b and a centerline (C) that coincides with the axis of rotation of the rotor incorporating the sheets.

FIG. 11 illustrates the holes 28a and the oblong bosses 28b the largest dimension of which is oriented in a radial direction, and FIG. 12 illustrates the holes 28a and the oblong bosses 28b the largest dimension of which is oriented in a direction perpendicular to the radial direction.

In the exemplary embodiment according to FIG. 11, the magnetic sheets 26a and 26b are immobilized together in a preferred direction tangential to the sheets and in a radial direction.

In the exemplary embodiment according to FIG. 12, the magnetic sheets 27a and 27b are immobilized together in a preferred radial direction and in a tangential direction.

The immobilization of the magnetic sheets in a tangential direction makes it possible to lock the sheets when they are subjected to a torque directed along the centerline (C) and the immobilization of the magnetic sheets in a radial direction makes it possible to lock the sheets when they are subjected to a shock in a radial direction and/or vibrations.

According to other embodiments, the locking means 28a and 28b can be bosses each comprising a first face forming a cavity and a second projecting face, the first and second faces of adjacent bosses being inserted without clearance, being deformed by contact and being secured so that the sheets 26a, 26b, 27a, 27b are immobilized as will be described hereinafter.

Figure 13:
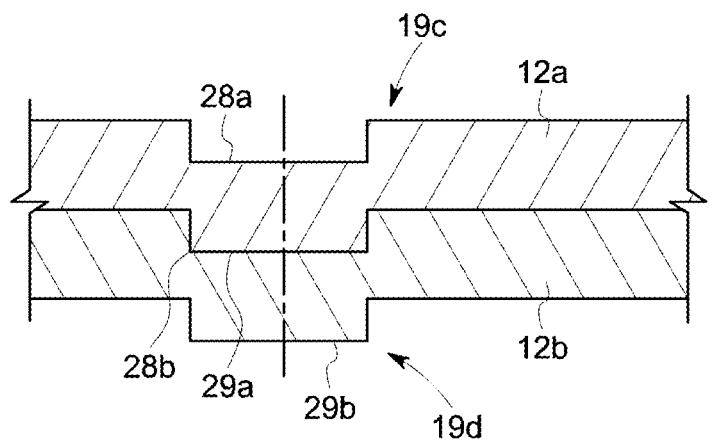
FIG. 13 shows a third embodiment of means for locking magnetic sheets.

Reference is now made to FIG. 13, which represents a partial cross-section of the magnetic sheets referenced 12a and 12b comprising a third embodiment of the locking means, along section plane (VII-VII).

The locking means 19c of the magnetic sheet 12a includes a boss having a first face 28a forming a cavity and a second face 28b projecting from the magnetic sheet opposite to the first face.

The locking means 19d of the magnetic sheet referenced 12b includes a boss having a first face 29a entering into the magnetic sheet 12a forming a cavity and a second face 29b projecting from the magnetic sheet opposite to the first face.

The second face 28b of the locking means of the magnetic sheet referenced 12a and the first face 29a of the locking means of the magnetic sheet referenced 12b are dimensioned in such a way that the second face 28b is inserted without clearance into the first face 29a so that the sheets 12a and 12b are immobilized.

The two locking means 19c and 19d are in contact and secured.

The locking means are obtained by punching.

Figure 14:
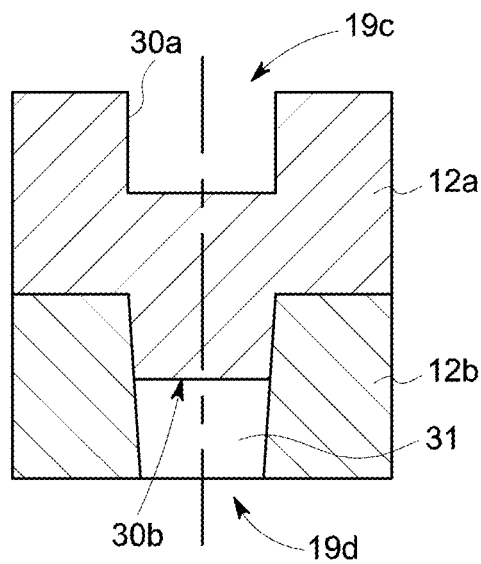
FIG. 14 shows a fourth embodiment of means for locking magnetic sheets.

Reference is now made to FIG. 14, which represents a partial cross-section of the magnetic sheets referenced 12a and 12b comprising a fourth embodiment of the locking means, along section plane (VII-VII).

The locking means 19c of the magnetic sheet referenced 12a includes a boss having a first face 30a forming a cavity and a second face 30b projecting from the magnetic sheet opposite to the first face.

The locking means 19d of the magnetic sheet referenced 12b comprises a conical hole 31.

The conical hole 31 and the projecting portion of the second face 30b are dimensioned in such a way that the second face 30b fits into the conical hole 31.

When the second face 30b is inserted into the conical hole 31, the two contact surfaces are deformed and are secured.

The two locking means 19c and 19d are secured.

The locking means 19c and 19d are obtained for example by punching.

Figure 15:
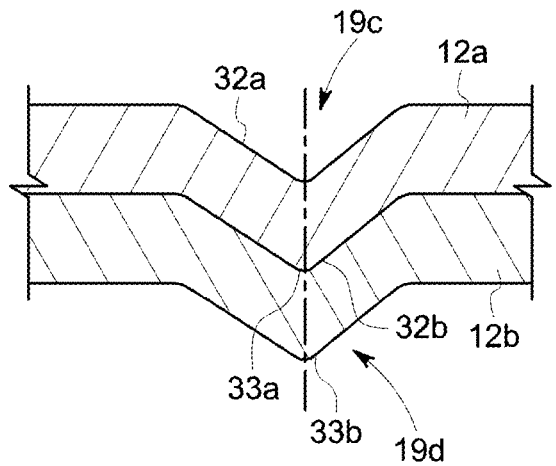
FIG. 15 shows a fifth embodiment of means for locking magnetic sheets.

Reference is now made to FIG. 15, which represents a partial cross-section of the magnetic sheets referenced 12a and 12b comprising a fifth embodiment of the locking means, along section plane (VII-VII).

The locking means 19c of the magnetic sheet referenced 12a includes a boss having a first face 32a forming a cavity and a second face 32b projecting from the magnetic sheet opposite to the first face.

The locking means 19d of the magnetic sheet referenced 12b includes a boss having a first face 33a forming a cavity and a second face 33b projecting from the magnetic sheet opposite to the first face.

The second face 32b of the locking means of the magnetic sheet referenced 12a and the first face 33a of the locking means of the magnetic sheet referenced 12b are dimensioned in such a way that the second face 32b is inserted without clearance in the first face 33a so that the sheets 12a and 12b are immobilized.

The two locking means 19c and 19d are in contact and secured.

The bosses 19c and 19d are obtained by stamping.

Figure 16:
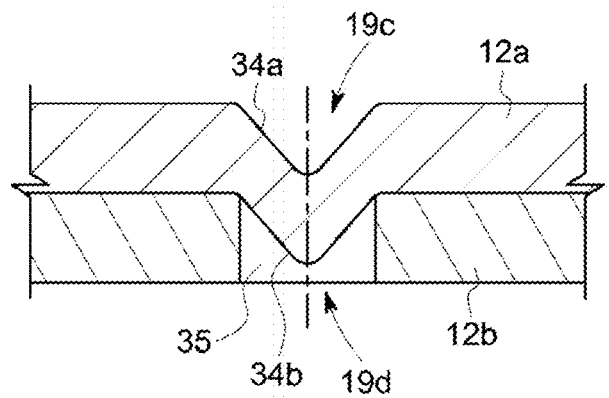
FIG. 16 shows a sixth embodiment of means for locking magnetic sheets.

Reference is now made to FIG. 16, which represents a partial cross-section of the magnetic sheets referenced 12a and 12b comprising a sixth embodiment of the locking means, along section plane (VII-VII).

The locking means 19c of the magnetic sheet 12a includes a boss having a first face 34a forming a cavity and a second face 34b projecting from the magnetic sheet opposite to the first face.

The locking means 19d of the magnetic sheet 12b comprises a hole 35.

The hole 35 and the second face 34b are dimensioned in such a way that the second face 34b fits into the hole 35.

When the second face 34b is inserted into the hole 35, the two contact surfaces are deformed and are secured.

The two locking means 19c and 19d are secured.

The boss 19c is obtained by stamping the magnetic sheet 12a and the hole 35 is obtained for example by punching the magnetic sheet 12b.

Figure 17:
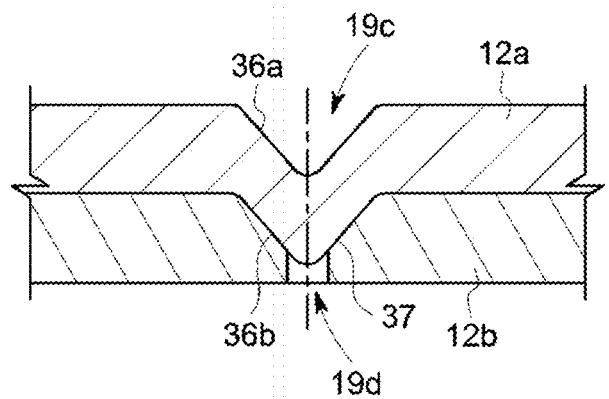
FIG. 17 shows a seventh embodiment of means for locking magnetic sheets.

Reference is now made to FIG. 17, which represents a partial cross-section of the magnetic sheets referenced 12a and 12b comprising a seventh embodiment of the locking means, along section plane (VII-VII).

The locking means 19c of the magnetic sheet referenced 12a includes a boss having a first face 36a forming a cavity and a second face 36b projecting from the magnetic sheet opposite to the first face.

The locking means 19d of the magnetic sheet referenced 12b comprises a conical hole 37, opening for example into a cylindrical hole.

The conical hole 37 and the second face 36b are dimensioned in such a way that the second face 36b fits into the conical hole 37.

When the second face 36b is inserted into the conical hole 37, the two contact surfaces are deformed and are secured.

The two locking means 19c and 19d are secured, the boss 19c is obtained by stamping, and the conical hole 37 is obtained for example by punching.

In the described embodiments, the deformation and securing of the locking means 19c and 19d are achieved by differences of diameters or differences of angles between the first face forming a cavity and the second projecting face.

Figure 18:
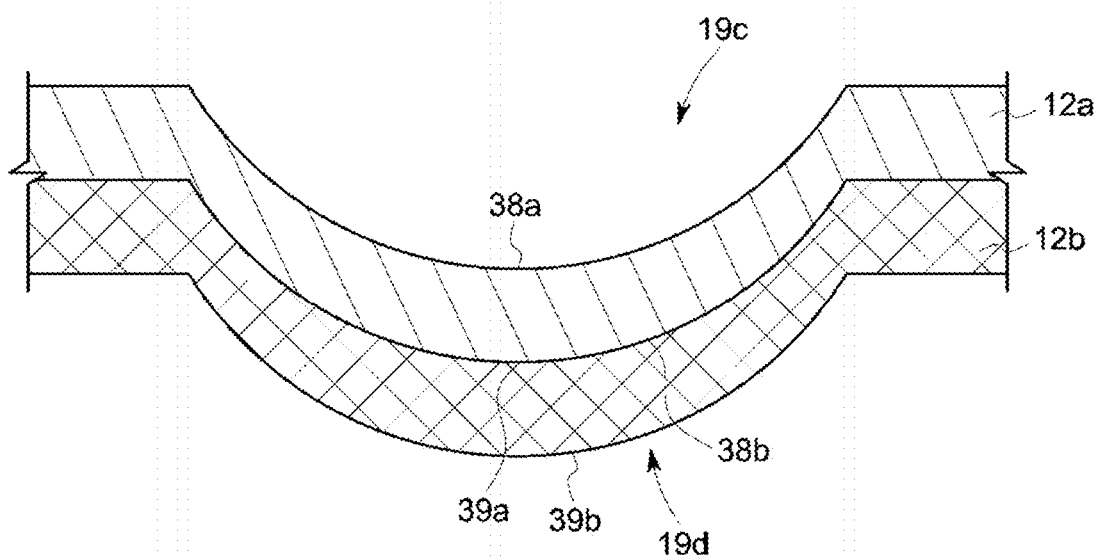
FIG. 18 shows an eighth embodiment of means for locking magnetic sheets.

Reference is now made to FIG. 18, which represents a partial cross-section of the magnetic sheets referenced 12a and 12b comprising an eighth embodiment of the locking means, along section plane (VII-VII).

The locking means 19c of the magnetic sheet referenced 12a includes a boss having a first face 38a forming a cavity and a second face 38b projecting from the magnetic sheet opposite to the first face.

The locking means 19d of the magnetic sheet referenced 12b includes a boss having a first face 39a forming a cavity and a second face 39b projecting from the magnetic sheet opposite to the first face.

The second face 38b of the locking means of the magnetic sheet referenced 12a and the first face 39a of the locking means of the magnetic sheet referenced 12b are dimensioned in such a way that the second face 38b is inserted without clearance into the first face 39a so that the sheets 12a and 12b are immobilized.

The two bosses in contact are deformed and secured, and are circular for example.

The bosses are obtained by stamping.

In embodiments two to eight of the locking means described previously in FIGS. 11 to 18, the means of locking adjacent sheets cooperate so that the means engage with one another.

Such engagement prevents a relative movement of a magnetic sheet relative to another magnetic sheet.

In the embodiments described previously, the boss comprising the first face forming a cavity and a second face projecting therefrom can be obtained by punching for example on half of the thickness of the magnetic sheet, or by stamping on a depth equivalent to one time the thickness of the magnetic sheet, two times the thickness of the magnetic sheet or more.

Figure 19:
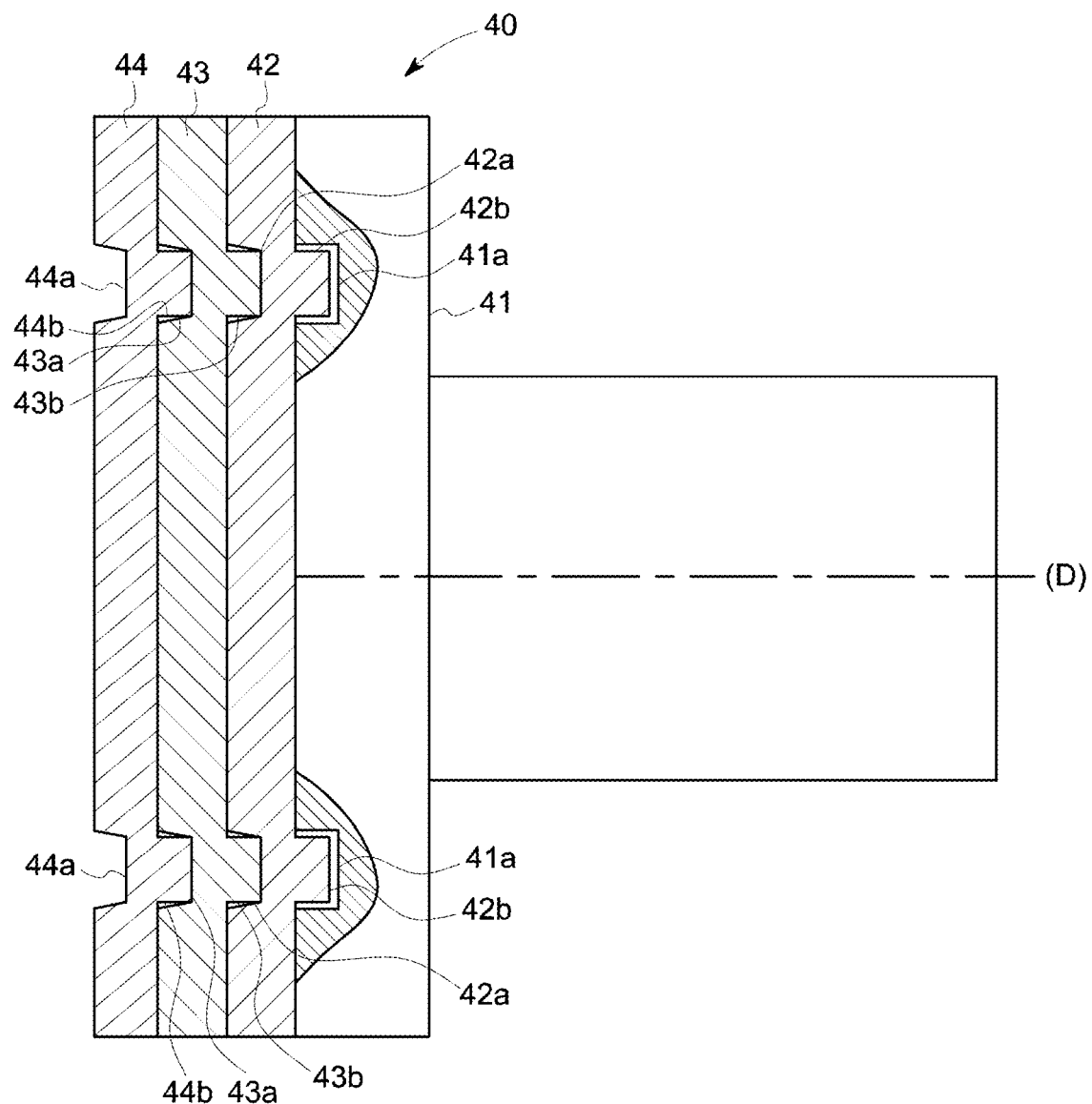
FIG. 19 shows a first embodiment of a rotor for a synchronous or asynchronous wound-rotor rotary electric machine.

With reference now to FIG. 19, illustrated is a partial cross-section of a first embodiment of a rotor 40 along an axial direction for a synchronous or asynchronous wound-rotor rotary electric machine.

The rotor 40 comprises a half-shaft 41 comprising holes 41a, magnetic sheets 42, 43 and 44, all identical, stacked on the half-shaft 41 and an axis of rotation (D).

Each sheet 42, 43 and 44 comprises two locking means according to the third embodiment illustrated in FIG. 13. Each magnetic sheet comprises a boss having a first face 42a, 43a and 44a forming a cavity and a second face 42b 43b and 43c projecting from the magnetic sheet opposite to the first face.

The second face 43b and 44b of each boss from the magnetic sheets 43 and 44 is inserted into the first face 42a and 43a of each boss of the magnetic sheets and the second face 42b of each boss of the sheet 42 is inserted into a hole 41a of the half-shaft 41.

According to another embodiment, the second face 42b is inserted without clearance into the hole 41a and is deformed by contact and secured in order to immobilize the magnetic sheet and the half-shaft.

The locking means of each magnetic sheet are inserted with or without clearance into the locking means of adjacent elements, each adjacent element comprising a magnetic sheet or a half-shaft, and are distributed over each magnetic sheet so as to immobilize the sheet in a radial and/or tangential direction relative to the adjacent elements when the sheet is subjected to a shock or vibrations in a radial direction and/or a rotation under the effect of a torque along the axis (D).

Consequently, each locking means is disposed over the same circumference of the sheet and the locking means are distributed uniformly over the sheet along an angle oriented along the axial direction (D).

The magnetic sheets are immobilized with or without clearance.

According to another embodiment not shown, the hole 41a is replaced by a stud to be inserted with or without clearance into the first faces 42a, 43a and 44a forming a cavity.

According to another embodiment of the rotor, the rotor comprises at a first end a half-shaft as represented in FIG. 19, comprising a hole 41a, and it comprises at a second end a second half-shaft comprising a stud cooperating with the hole.

According to other embodiments, each magnetic sheet can comprise more than two locking means, according to one embodiment or according to different embodiments. The locking means are distributed uniformly over the sheet along an angle oriented in the axial direction (D) over the same circumference of the magnetic sheet.

Figure 20:
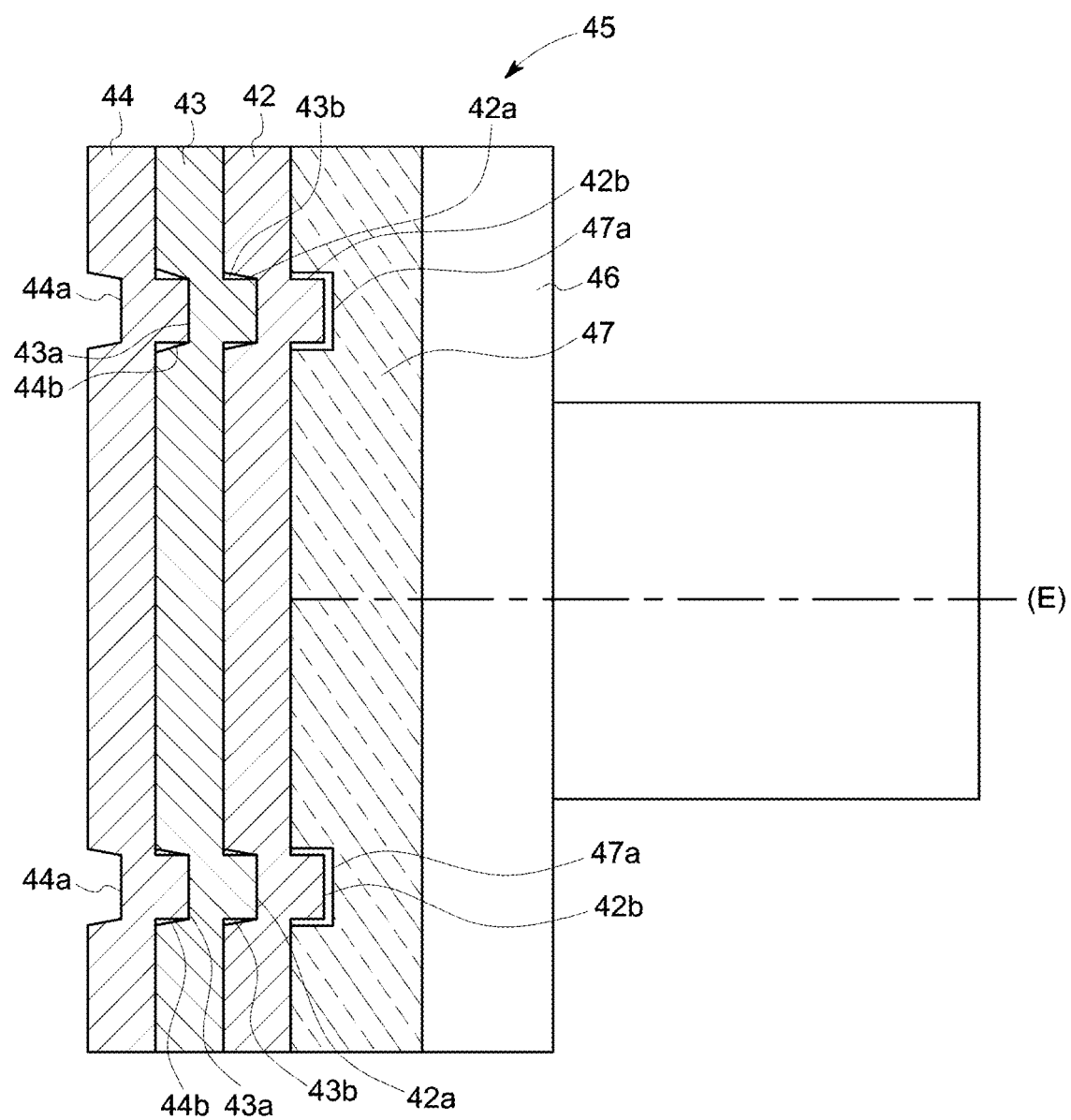
FIG. 20 shows a first embodiment of a rotor for an asynchronous rotary electric machine.

Reference is now made to FIG. 20 which illustrates a partial cross-section of a first embodiment of a rotor 45 for an asynchronous rotary electric machine along an axial direction.

The rotor 45 comprises a half-shaft 46, a short-circuit disc 47, magnetic sheets 42, 43 and 44 and an axis of rotation (E).

The short-circuit disc 47 is inserted between the half-shaft 46 and the magnetic sheets.

The short-circuit disc 47 comprises holes 47a cooperating with the second face 42b of each boss of the sheet 42.

The locking means of each magnetic sheet are inserted with or without clearance into the locking means of adjacent elements, each adjacent element comprising a magnetic sheet or a short-circuit disc, and are distributed over each magnetic sheet so as to immobilize in a radial and/or tangential direction the sheet relative to the adjacent elements when the sheet is subjected to a shock or vibrations in the radial direction and/or a rotation under the effect of a torque along the axis (E).

Consequently, each locking means is disposed over the same circumference of the sheet and the locking means are distributed uniformly over the sheet along an angle oriented along the axial direction (E).

The magnetic sheets are immobilized with or without clearance.

According to another embodiment not shown, the hole 47a is replaced by a stud to be inserted with or without a clearance into the first faces 42a, 43a and 44a forming a cavity.

According to another embodiment of the rotor, the rotor comprises at a first end of the magnetic circuit thereof a first short-circuit disc comprising a hole as shown in FIG. 20, and it comprises at a second end of the magnetic circuit thereof a second short-circuit disc comprising a stud cooperating with the hole.

According to other embodiments, each magnetic sheet can comprise more than two locking means according to one of the embodiments previously described, each locking means being able to be according to a different embodiment. The locking means are distributed uniformly over the sheet along an angle oriented in the axial direction (E) over the same circumference of the magnetic sheet.

According to other embodiments, the rotors 40 and 45 respectively for a synchronous or asynchronous wound-rotor rotary electric machine and asynchronous rotary electric machine comprise locking means according to one of the first, second, third, fourth, fifth, sixth, seventh and eighth embodiments as defined previously in FIGS. 7, 8, 13, 14, 15, 16, 17 and 18 arranged according to any one of FIGS. 9, 10, 11, 12.

Figure 21:
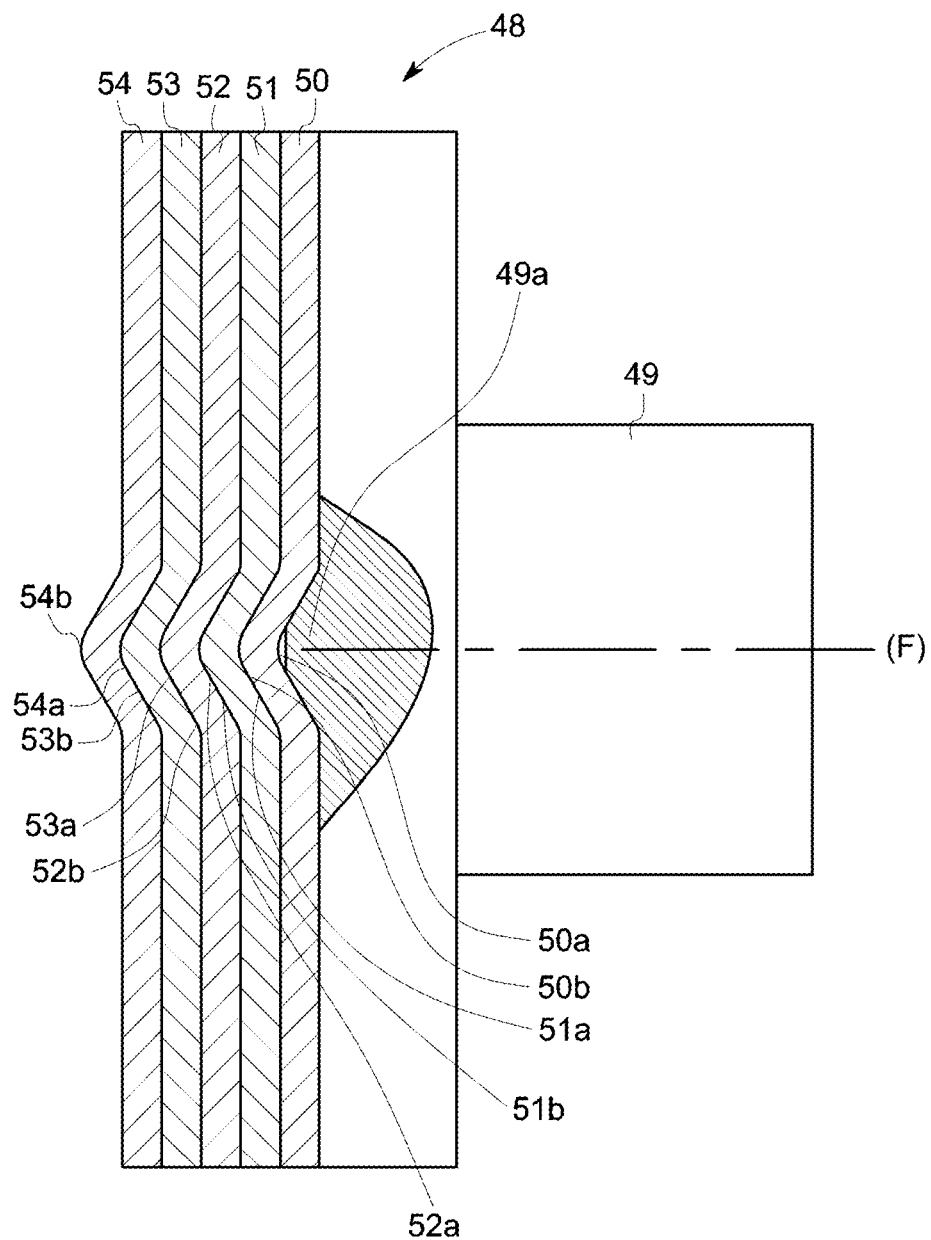
FIG. 21 shows a second embodiment of a rotor for a synchronous or asynchronous wound-rotor rotary electric machine.

Reference is now made to FIG. 21, which illustrates a partial cross-section of a second embodiment of a rotor 48 for a synchronous or asynchronous wound-rotor rotary electric machine along an axial direction.

The rotor 48 comprises a half-shaft 49 comprising a locking means comprising a boss 49a located at the center thereof, produced for example by machining, and circular magnetic sheets 50, 51, 52, 53 and 54, all identical and stacked onto the half-shaft 49, and an axis of rotation (F).

Each sheet 50, 51, 52, 53 and 54 comprises a locking means situated at the center thereof and comprising a boss having a first face 50a, 51a, 52a, 53a and 54a forming a cavity and a second face 50b, 51b, 52b, 53b and 54b projecting from the magnetic sheet opposite to the first face according to the fifth embodiment of the locking means illustrated in FIG. 15.

The second face 50b, 51b, 52b and 53b of each boss of the magnetic sheets 50, 51, 52 and 53 is inserted into the first face 51a, 52a, 53a and 54a of each boss and the boss 49a of the half-shaft 49 is inserted into the first face 50a of the magnetic sheet 50.

According to another embodiment not shown, the boss 49a is replaced by a cavity for receiving with or without clearance the second faces 50b, 51b, 52b and 53b projecting therefrom.

According to another embodiment of the rotor represented in FIG. 21, the rotor comprises at a first end a half-shaft having a boss 49a, and it comprises at a second end a second half-shaft comprising a cavity cooperating with the face projecting from the magnetic sheet.

The locking means of each magnetic sheet are preferably inserted without clearance into locking means of adjacent elements, each adjacent element comprising a magnetic sheet or a half-shaft.

The magnetic sheets are immobilized in a radial direction in order to improve the resistance of the rotor 48 to shocks and/or vibrations.

According to another embodiment not shown, the rotor 48 comprises a half-shaft 49 having a plurality of bosses referenced 49a distributed uniformly or substantially uniformly over a diameter close to the center of the half-shaft 49.

Each boss referenced 49a is produced for example by machining and is preferably inserted without clearance into a cavity referenced 50a.

The additional bosses further enable the magnetic sheets to be tangentially immobilized so as to improve the resistance of the rotor 48 to the effect of torque.

According to another embodiment not shown, a rotor for an asynchronous rotary electric machine comprises a half-shaft referenced 49, a short-circuit disc inserted between the half-shaft and the magnetic sheets.

According to one embodiment, the short-circuit disc comprises the boss referenced 49a at the center thereof.

According to another embodiment, the short-circuit disc comprises at least two bosses referenced 49a uniformly or substantially uniformly distributed over a diameter close to the center of the short-circuit disc.

The bosses are produced, for example, by machining and are preferably inserted without a clearance into the cavities referenced 50a of the magnetic sheets. The short-circuit disc and the magnetic sheets are immobilized in a radial direction and/or a tangential direction.

Figure 22:
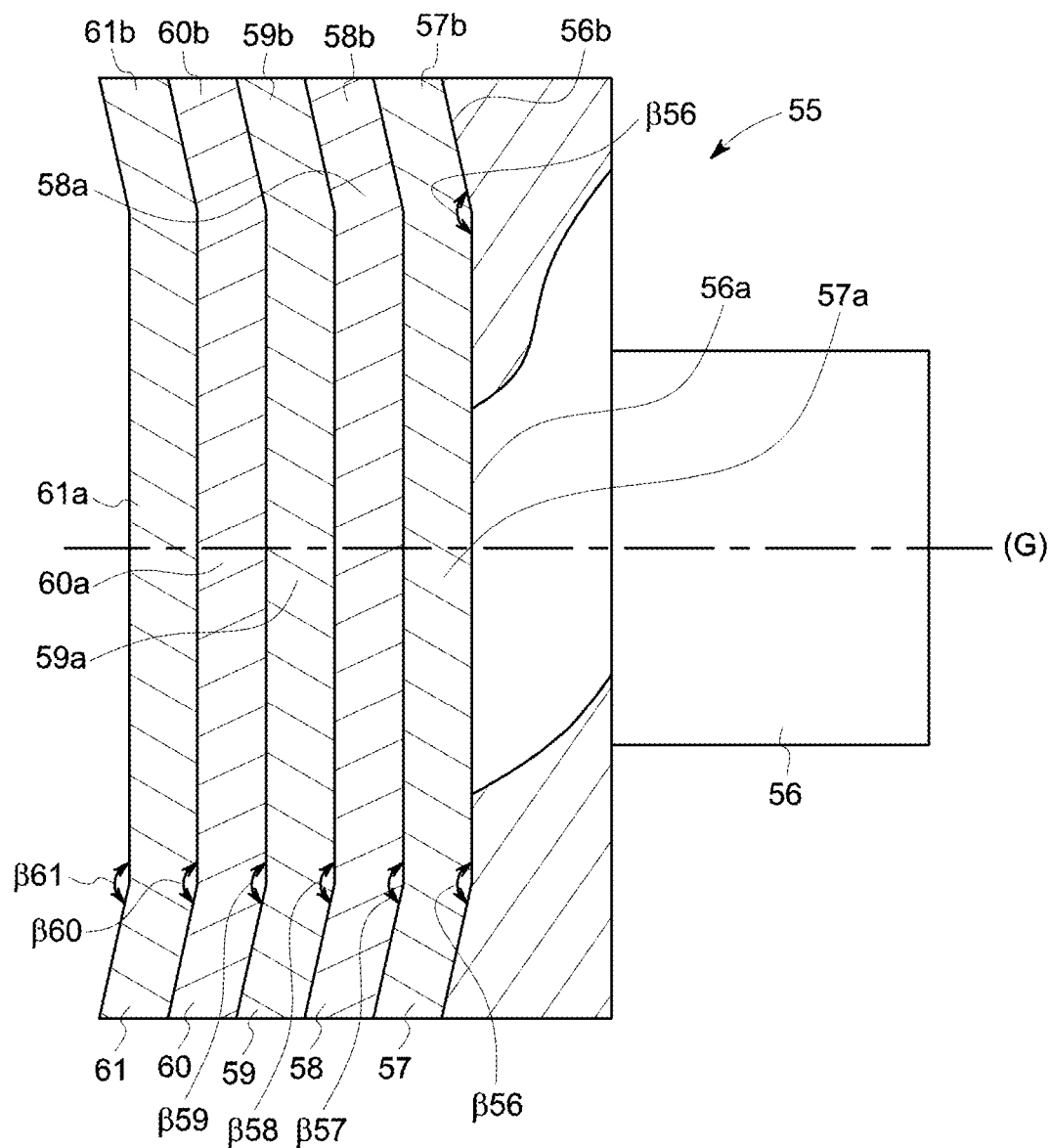
FIG. 22 shows a third embodiment of a rotor for a synchronous or asynchronous wound-rotor rotary electric machine comprising a ninth embodiment of means for locking magnetic sheets.

With reference to FIG. 22, illustrated is a partial cross-section of a third embodiment of a rotor 55 for a synchronous or asynchronous wound-rotor rotary electric machine along an axial direction.

The rotor 55 comprises a ninth embodiment of means for locking magnetic sheets.

The rotor 55 comprises a half-shaft 56, an axis of rotation (G) and circular magnetic sheets 57, 58, 59, 60 and 61 that are all identical or substantially identical, stacked on the half-shaft 56.

The half-shaft 56 comprises a central portion 56a and a peripheral portion 56b located on an outer periphery of the shaft, the two portions being in contact with the magnetic sheet referenced 57.

The central 56a and peripheral 56b portions form an angle β56.

Each magnetic sheet 57, 58, 59, 60 and 61 comprises a central portion 57a, 58a, 59a, 60a and 61a and a peripheral portion 57b, 58b, 59b, 60b and 61b located on an outer periphery of the magnetic sheet.

The central portion 57a, 58a, 59a, 60a, 61a and the peripheral portion 57b, 58b, 59b, 60b and 61b of the magnetic sheet 57, 58, 59, 60 and 61 form an angle β57, β58, β59, β60 and β61 obtained by bending the magnetic sheet.

The angle β56, β57, β58, β59, β60 and β61 and the dimensions of the peripheral portion 56b, 57b, 58b, 59b, 60b and 61b of each sheet and of the half-shaft are dimensioned in such a way that each magnetic sheet is inserted into adjacent elements so that the peripheral portion cooperates with the peripheral portion of the adjacent elements in order to prevent a radial displacement of the magnetic sheet relative to the adjacent elements.

Each element comprises a magnetic sheet or the half-shaft.

The radial locking means of magnetic sheets comprise the peripheral portion 56b of the half-shaft 56 and the peripheral portions 57b, 58b, 59b, 60b and 61b of the magnetic sheets 57, 58, 59, 60 and 61.

Advantageously, the peripheral portion also makes it possible to compensate for small thickness defects of the magnetic sheets 57 to 61 caused by the rolling of the magnetic sheets, known by the term rolled edges, and to increase the axial compacting pressure in the peripheral portion of the magnetic sheets, increasing the rigidity to flexing and torsion of the rotor dependent on the quality of the compacting of the sheets at the periphery thereof.

According to another embodiment not shown, a rotor for an asynchronous rotary electric machine comprises a half-shaft referenced 56, a short-circuit disc inserted between the half-shaft and the magnetic sheets.

The short-circuit disc comprises a central portion and a peripheral portion as previously described. The central and peripheral portions of the short-circuit disc and magnetic sheets form an angle β obtained respectively by machining and bending of the magnetic sheets.

The central and peripheral portions of the short-circuit disc and magnetic sheets are inserted into adjacent elements in order to radially lock the magnetic sheets.

Advantageously, the rotors compensate for the small thickness defects at the periphery of the magnetic sheets.

According to other embodiments, each magnetic sheet can include locking means in accordance with one of the fourth, fifth, sixth, seventh and eighth embodiments as previously defined in FIGS. 11, 13, 14, 15, 16, 17 and 18 and locking means according to the ninth embodiment as defined in FIG. 22.

The half-shafts, and if applicable the short-circuit discs, are designed so as to cooperate with the magnetic sheets.

Figure 23:
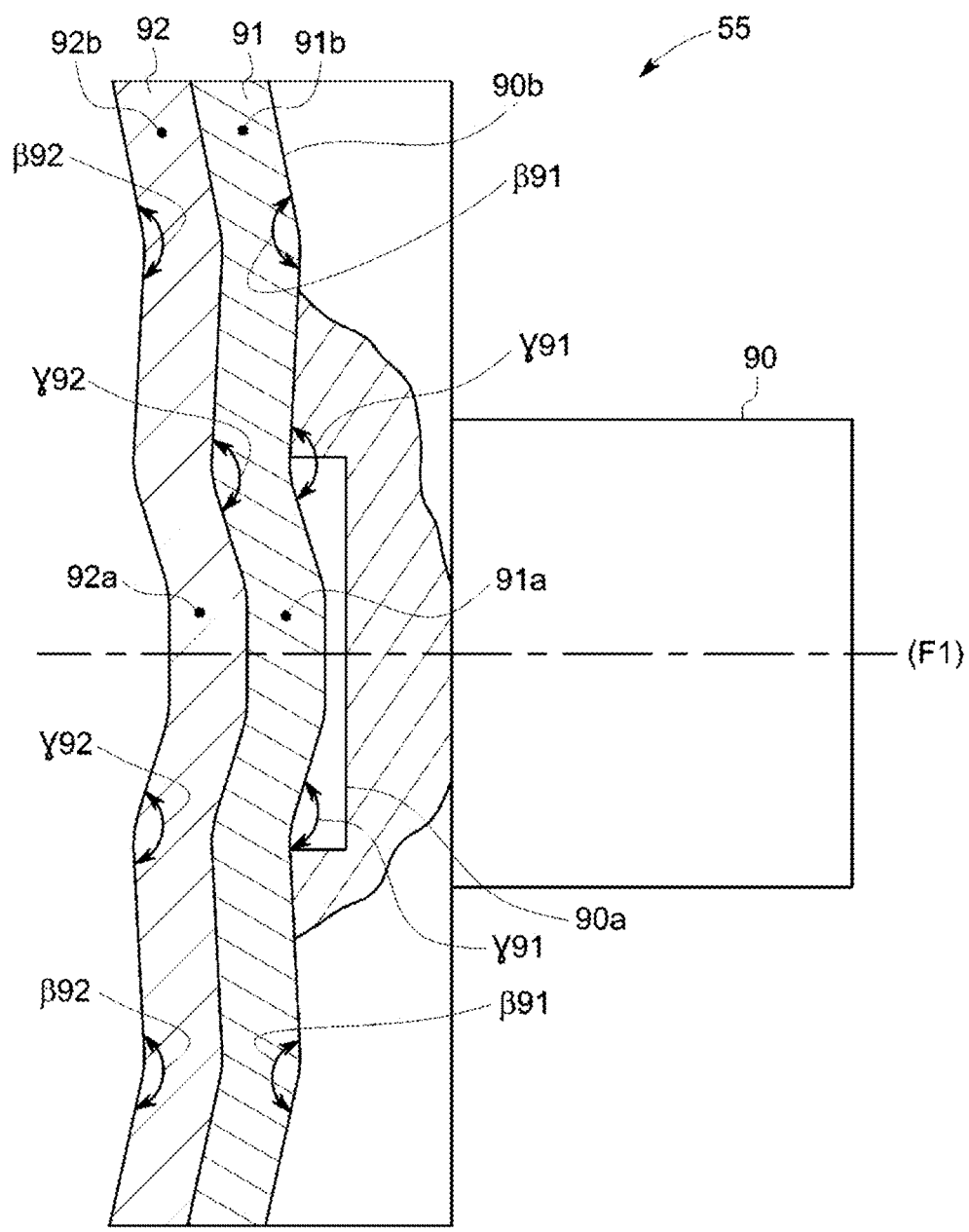
FIG. 23 shows a fourth embodiment of a rotor for a synchronous or asynchronous wound-rotor rotary electric machine comprising a plurality of embodiments of means of locking magnetic sheets.

With reference to FIG. 23, illustrated is a partial cross-section of a fourth embodiment of a rotor 55 for a synchronous or asynchronous wound-rotor rotary electric machine along an axial direction.

The rotor 55 comprises a half-shaft 90, an axis of rotation (F1) and circular magnetic sheets 91 and 92 that are identical or substantially identical, stacked on the half-shaft 90.

The half-shaft 90 comprises a central portion 90a and a peripheral portion 90b located on an outer periphery of the shaft, the peripheral portion 90b being in contact with the magnetic sheet referenced 91.

The central portions 91a, 92a and peripheral portions 91b, 92b form a first angle β91, β92 and a second angle γ91, γ92.

The central portion 90a of the half-shaft 90 comprises at the center thereof a blind hole or a counterbore.

Figure 24:
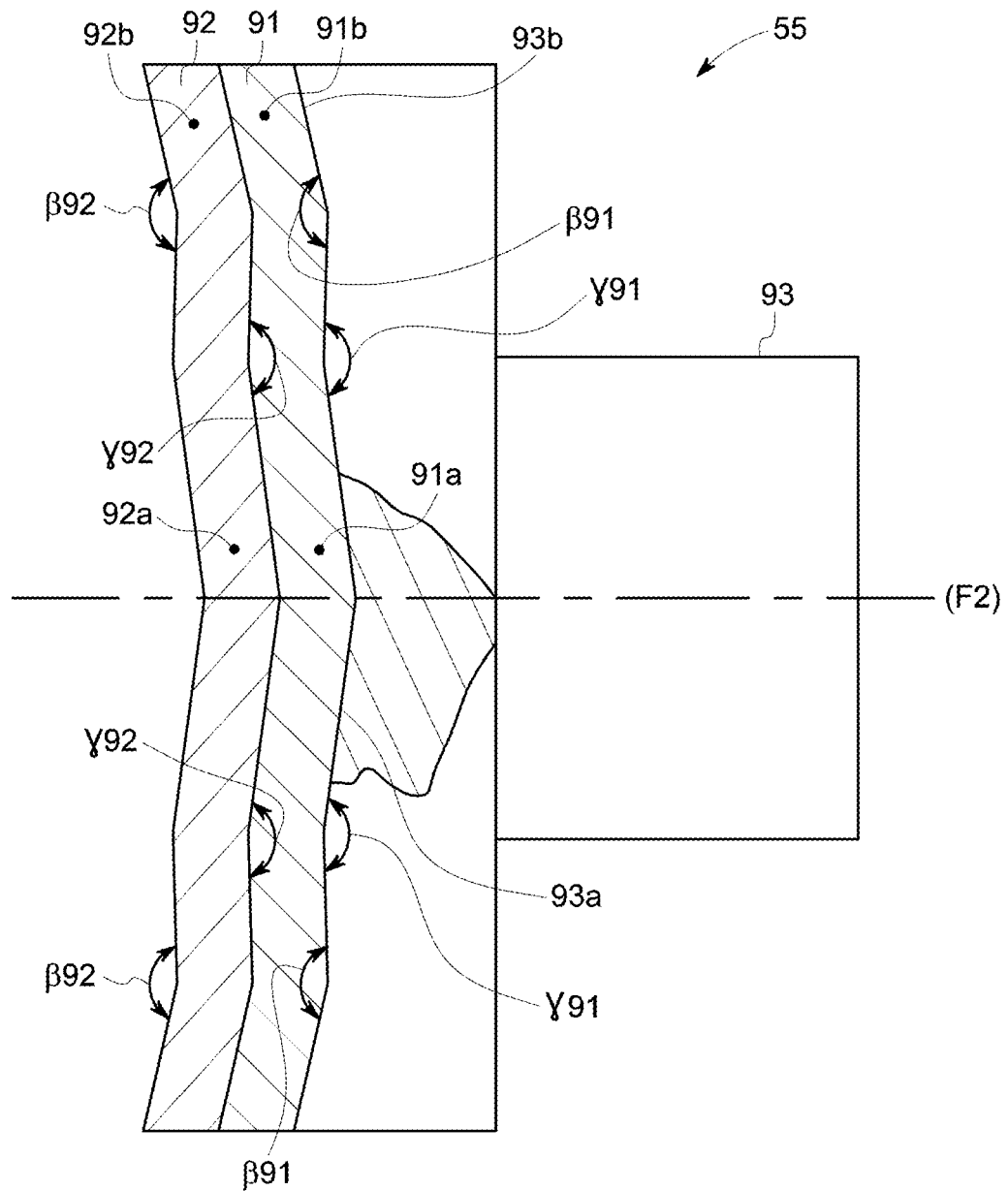
FIG. 24 shows a fifth embodiment of a rotor for a synchronous or asynchronous wound-rotor rotary electric machine comprising a plurality of embodiments of means of locking magnetic sheets.

With reference to FIG. 24, illustrated is a partial cross-section of a fifth embodiment of a rotor 55 for a synchronous or asynchronous wound-rotor rotary electric machine along an axial direction.

The rotor 55 comprises a half-shaft 93, an axis of rotation (F2) and the circular magnetic sheets 91 and 92 that are identical or substantially identical, stacked on the half-shaft 93.

The half-shaft 93 comprises a central portion 93a and a peripheral portion 93b located on an outer periphery of the shaft, the central portion 93a and the peripheral portion 93b being in contact with the magnetic sheet referenced 91.

The central portions 91a, 92a and peripheral portions 91b, 92b form a first angle β91, β92 and a second angle γ91 and γ92.

The central portion 93a of the half-shaft 93 comprises at the center thereof a second cavity, conical in shape at angle γ91.

The counterbore, the blind hole or the second cavity increase the axial compacting of the periphery of the magnetic sheets relative to the axial compacting of the center of the magnetic sheets.

Furthermore, this embodiment increases the rigidity of the rotor to flexing and torsion and is preferably implemented when the maximum thickness of the magnetic sheets is located at the center thereof, decreasing the axial compacting of the periphery of the magnetic sheets and consequently the rigidity of the rotor which depends on the quality of the compacting of the periphery of the magnetic sheets.

Figure 25:
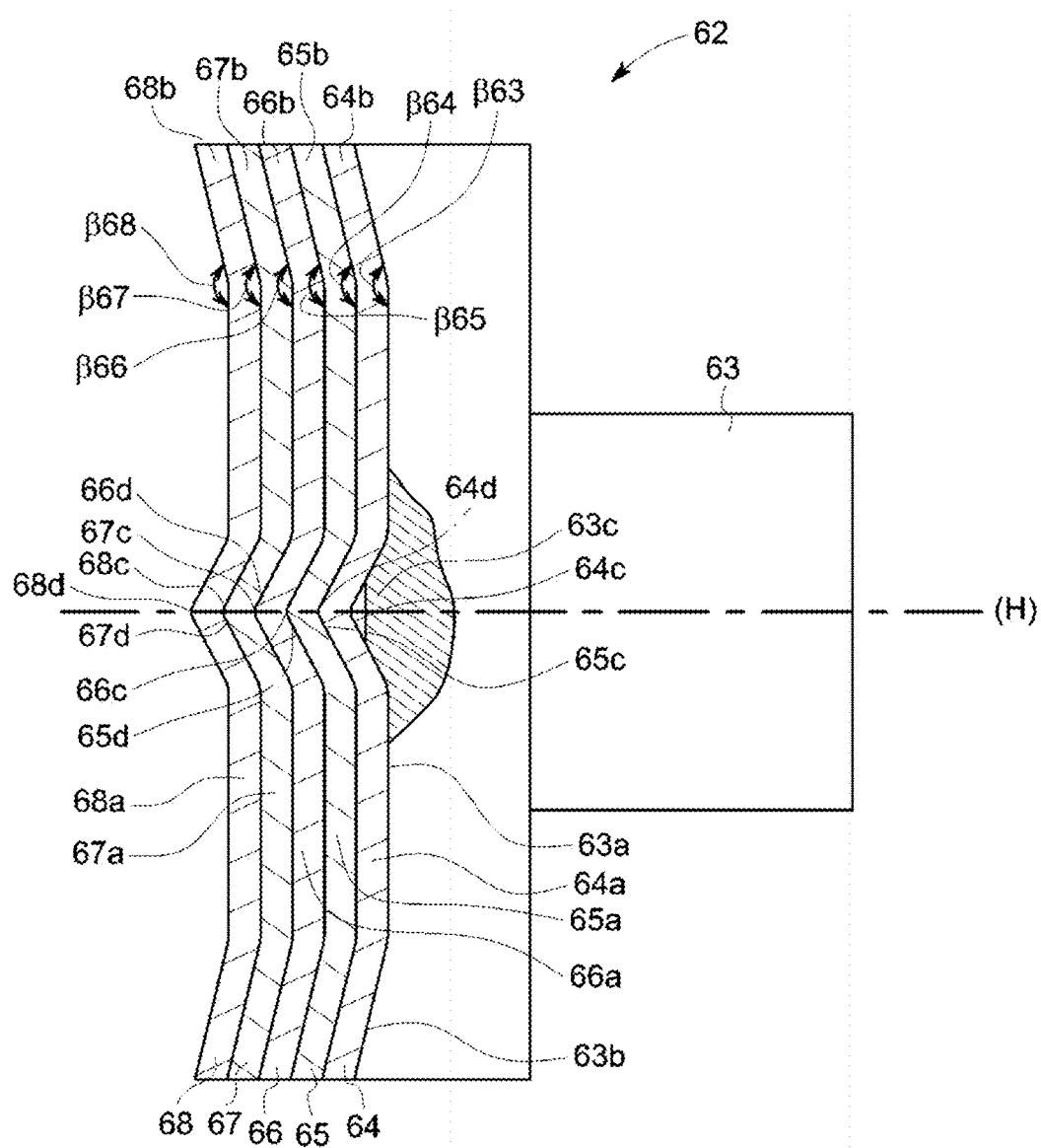
FIG. 25 shows a sixth embodiment of a rotor for a synchronous or asynchronous wound-rotor rotary electric machine comprising a plurality of embodiments of means of locking magnetic sheets.

FIG. 25 shows an example of a partial cross-section of a sixth embodiment of a rotor 62 for a synchronous or asynchronous wound-rotor rotary electric machine along an axial direction.

In this embodiment each sheet and each half-shaft comprise locking means according to the fifth embodiment illustrated in FIG. 15 and the ninth embodiment illustrated in FIG. 22.

The rotor 62 comprises a half-shaft 63, an axis of rotation (H) and circular magnetic sheets 64, 65, 66, 67 and 68 that are all identical or substantially identical, stacked on the half-shaft 63.

The half-shaft 56 comprises a central portion 63a and a peripheral portion 63b located on an outer periphery of the shaft, the two portions being in contact with the magnetic sheet referenced 64.

The central 63a and peripheral 63b portions form an angle β63.

The central portion comprises a half-shaft 63 comprising a locking means comprising a boss 63c located at the center thereof, produced for example by machining.

Each magnetic sheet 64, 65, 66, 67 and 68 comprises a central portion 64a, 65a, 66a, 67a and 68a and a peripheral portion 64b, 65b, 66b, 67b and 68b located on an outer periphery of the magnetic sheet.

Each central portion 64a, 65a, 66a, 67a and 68a and each peripheral portion 64b, 65b, 66b, 67b and 68b of the same magnetic sheet form an angle β64, β65, β66, β67 and β68. In other words, the peripheral portion obtained by stamping is bent.

Each central portion 64a, 65a, 66a, 67a and 68a comprises a first locking means situated at the center thereof and comprising a boss having a first face 64c, 65c, 66c, 67c and 68c forming a cavity and a second face 64d, 65d, 66d, 67d and 68d projecting from the magnetic sheet opposite to the first face according to the fifth embodiment illustrated in FIG. 15.

The second face 64d, 65d, 66d and 67d of each boss of the magnetic sheets is inserted into the first face 65c, 66c, 67c and 68c of each boss and the boss 63c of the half-shaft 63 is inserted into the first face 64c of the magnetic sheet 64.

According to another embodiment not shown, the boss 63c is replaced by a cavity cooperating, with or without clearance, with the projecting face of the magnetic sheet.

The angle β63, β64, β65, β66, β67 and β68 and the dimensions of the peripheral portion 64b, 65b, 66b, 67b and 68b of each sheet and 63b of the half-shaft are dimensioned in such a way that each magnetic sheet is inserted into adjacent elements so that the peripheral portion cooperates with the peripheral portion of the adjacent elements in order to prevent a radial displacement of the magnetic sheet relative to the adjacent elements forming a second locking means.

The rotor 62 comprises two radial locking means of the magnetic sheets.

Advantageously, the peripheral portion also makes it possible to compensate for small thickness defects of the magnetic sheets 64, 65, 66, 67 and 68 caused by the rolling of the magnetic sheets, known by the term rolled edges, and to increase the compacting pressure in the peripheral portion of the magnetic sheets.

Figure 26:
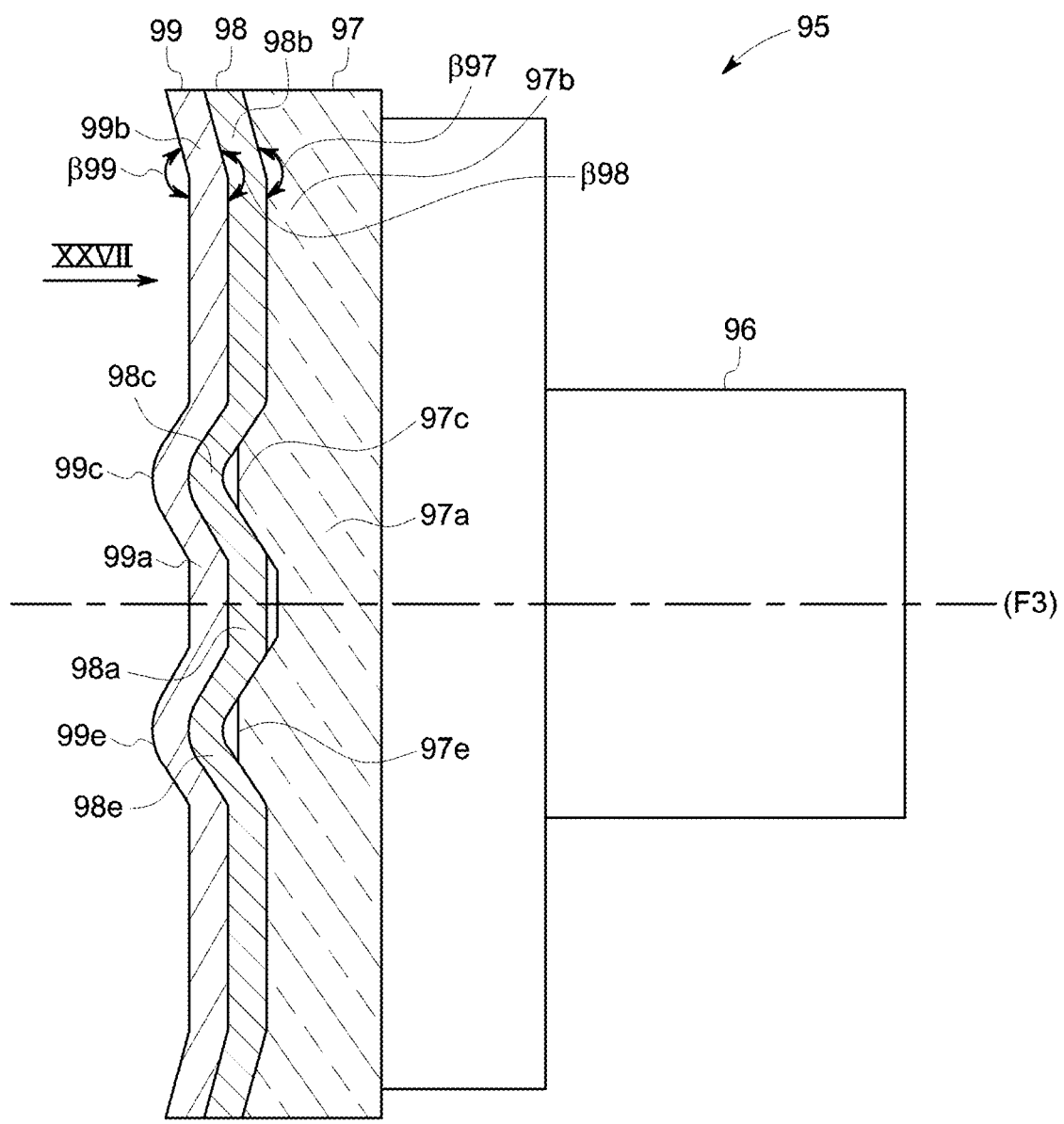
FIGS. 26 and 27 show a seventh embodiment of a rotor for a synchronous or asynchronous wound-rotor rotary electric machine comprising a plurality of embodiments of means for locking magnetic sheets.
Figure 27:
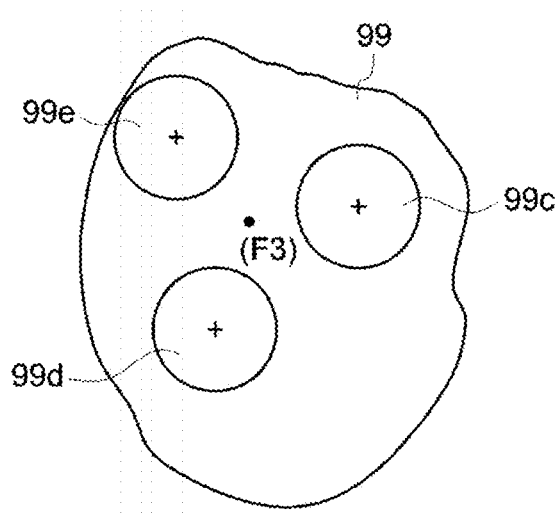

FIGS. 26 and 27 show an exemplary seventh embodiment of a rotor 95 for an asynchronous rotary electric machine.

With reference in particular to FIG. 26, illustrated is a partial cross-section of a seventh embodiment of a rotor 95 for an asynchronous rotary electric machine along an axial direction.

In this embodiment each sheet comprises locking means according to the fifth embodiment illustrated in FIG. 15 and the ninth embodiment illustrated in FIG. 22.

The rotor 95 comprises a half-shaft 96, an axis of rotation (F3), a short-circuit disc 97 stacked on the half-shaft and circular magnetic sheets 98 and 99 that are identical or substantially identical, stacked on the short-circuit disc 97.

The short-circuit disc 97 comprises a central portion 97a and a peripheral portion 97b located on an outer periphery of the short-circuit disc, the two portions being in contact with the magnetic sheet referenced 98.

The central 97a and peripheral 97b portions form an angle β97.

The central portion 97a of the short-circuit disc 97 comprises a locking means comprising at least two bosses, for example as shown, three bosses 97c, 97d and 97e distributed uniformly or substantially uniformly over a diameter close to the center of the short-circuit disc and produced for example by machining.

Each magnetic sheet 98 and 99 comprises a central portion 98a and 99a, and a peripheral portion 98b and 99b located on an outer periphery of the magnetic sheet.

Each central portion 98a and 99a and each peripheral portion 98b and 99b of the same magnetic sheet form an angle β98 and β99. In other words, the peripheral portion obtained by stamping is bent, or formed by the axial compacting of the magnetic circuit.

Each central portion 98a and 99a comprises a first locking means comprising three bosses 98c, 98d, 98e, 99c, 99d and 99e according to the fifth embodiment illustrated in FIG. 15, distributed uniformly or substantially uniformly over a diameter close to the center of the magnetic sheet.

Each boss comprises a first face forming a cavity and a second face projecting from the magnetic sheet opposite to the first face according to the fifth embodiment illustrated in FIG. 15.

The second face of each boss of the magnetic sheets is inserted into the first face of each boss and the bosses 97c, 97d, 97e of the short-circuit disc 97 are inserted into the first face in cavity form of the bosses 98c, 98d and 98e of the magnetic sheet 98.

The angle β97, β98 and β99 and the dimensions of the peripheral portion 98b and 99b of each sheet 97b of the short-circuit disc are dimensioned in such a way that each magnetic sheet is inserted into adjacent elements so that the peripheral portion cooperates with the peripheral portion of the adjacent elements in order to prevent a radial displacement of the magnetic sheet relative to the adjacent elements forming a second locking means.

FIG. 27 shows a partial view of the rotor 95 along the direction XXVII represented in FIG. 26.

In view is the magnetic sheet 99 comprising the three bosses 99c, 99d and 99e distributed uniformly or substantially uniformly over a diameter close to the center of the magnetic sheet.

The rotor 95 comprises two radial and tangential locking means improving strength and robustness to shocks and vibrations.

Moreover, the rotor 95 has greater resistance to the electrical short-circuit torque of the stator or to a torque overload caused by a machine coupled to the rotor.

According to another embodiment not shown, the bosses 97c, 97d and 97e are replaced by cavities cooperating, with or without clearance, with the projecting face of the bosses 98c, 98d and 98e of the magnetic sheet.

Figure 28:
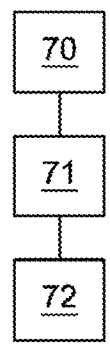
FIG. 28 shows a first embodiment of a rotor.

FIG. 28 describes a first embodiment of a rotor.

During step 70, the locking means are made on each of the magnetic sheets by stamping and/or punching each sheet individually.

The stamping and/or punching operation can be achieved separately or at the same time the magnetic sheets are cut.

In the next step 71, the magnetic sheets comprising the locking means are inserted between two half-shafts or two short-circuit discs in such a way that the locking means of each magnetic sheet cooperate with adjacent elements so as to immobilize the magnetic sheet in a radial and/or tangential direction relative to the adjacent elements.

In step 72, tie rods are inserted into retaining holes of each of the magnetic sheets in such a way that the magnetic sheets are held compacted between the half-shaft, or between the two short-circuit discs which in turn are compacted between two half-shafts.

Figure 29:
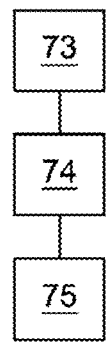
FIG. 29 shows a second embodiment of a rotor.

FIG. 29 describes a second embodiment of a rotor.

During step 73, the half-shafts or short-circuit discs are for example machined so as to form locking means, for example bosses.

A first half-shaft or a first short-circuit disc comprises a projecting portion intended to form the first face forming a cavity of the bosses of the magnetic sheets, and a second half-shaft or a second short-circuit disc comprises a cavity which will form the second projecting face of the bosses of the magnetic sheets.

Figure 30:
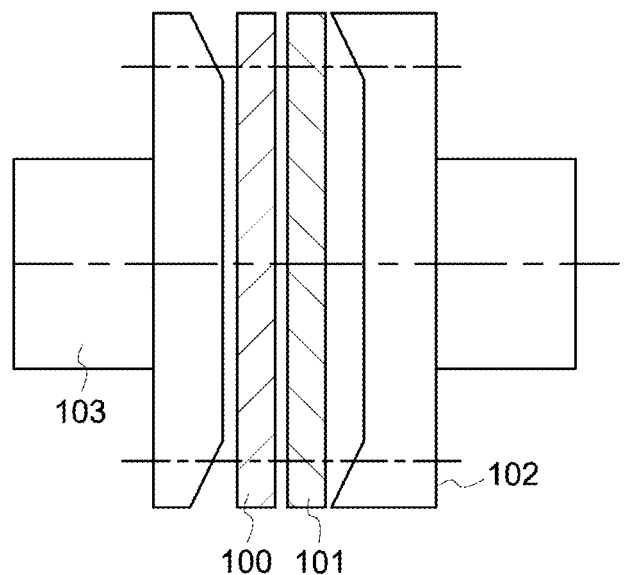
FIG. 30 shows the initial configuration of the second embodiment of a rotor.

FIG. 30 illustrates two magnetic sheets 100 and 101 and the first and second half-shafts 102 and 103 that will form the boss during the compacting of the sheets.

In step 74, the magnetic sheets are inserted between the two half-shafts or short-circuit discs.

In step 75, tie rods are inserted into retaining holes of each of the magnetic sheets in such a way that the magnetic sheets are compacted between the two half-shafts or the short-circuit discs.

The tightening action of the tie rods exerts a compacting force on the magnetic sheets between the half-shafts or between the short-circuit discs which in turn are compacted between the half-shafts.

Said compacting force, by deformation of the magnetic sheets, forms the radial and/or tangential locking means in the magnetic sheets, such as bosses for example.

Figure 31:
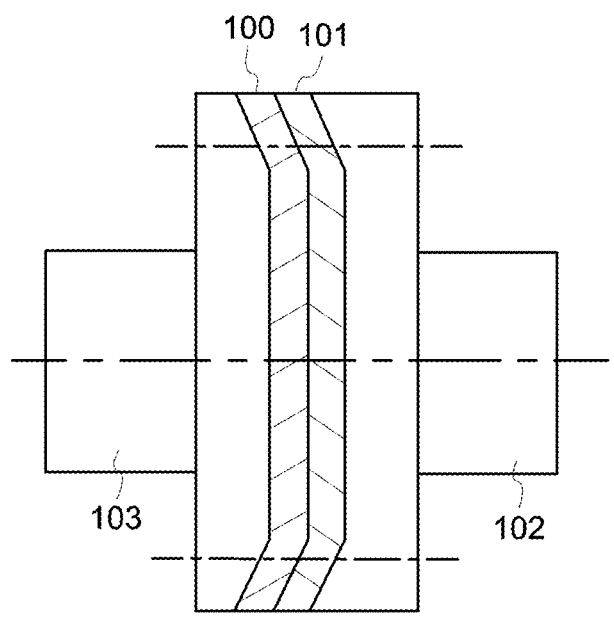
FIG. 31 shows the final configuration of the second embodiment of a rotor.

FIG. 31 shows the end of the forming of the locking means at the end of compacting the magnetic circuit between the two half-shafts.

The second embodiment of the rotor requires additional compacting force, which can lead to increasing the size and/or number of tie rods, thus increasing the cost of the rotor.

In the second embodiment of the rotor, the locking means are produced during the step of compacting magnetic sheets, which avoids producing the locking means on each of the magnetic sheets by stamping and/or punching of each magnetic sheet individually, thus reducing the cost of the rotor or compensating for the additional cost of increasing the size and/or number of tie rods.

Figure 32:
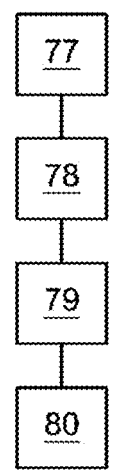
FIG. 32 shows a third embodiment of a rotor.

FIG. 32 describes a third embodiment of a rotor.

The third embodiment is a compromise between the first embodiment illustrated in FIG. 28 and the second embodiment illustrated in FIG. 29.

During step 77, the locking means comprising bosses for example, are produced partially on each of the magnetic sheets, for example by a partial stamping of bosses in the magnetic sheets, during an operation that is separate from or simultaneous with the operation of cutting sheets from the roll of magnetic sheets produced by a rolling.

The radial and/or tangential locking means, for example bosses, are preformed, that is, the bosses do not have their shape and final dimensions.

The shape and final dimensions of the bosses are obtained during the last step of compacting magnetic sheets.

In a step 78, the half-shafts or short-circuit discs are machined, for example, so as to form locking means, for example bosses.

A first half-shaft or a first short-circuit disc comprises a projecting portion intended to form the first face forming a cavity of the bosses of the magnetic sheets, and a second half-shaft or a second short-circuit disc comprises a cavity which will form the second projecting face of the bosses of the magnetic sheets.

Figure 33:
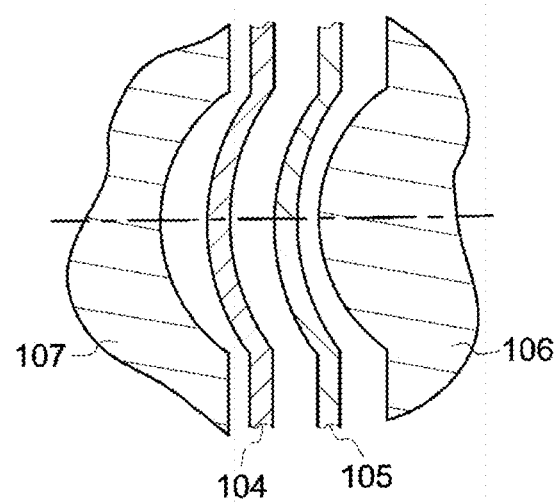
FIG. 33 shows the initial configuration of the third embodiment of the rotor.

FIG. 33 shows two magnetic sheets 104 and 105 comprising circular bosses preformed during step 77 and two half-shafts 106 and 107 or short-circuit discs.

The first half-shaft 106 comprises a projecting portion intended to form the first face forming a cavity of the bosses of the magnetic sheets, and the second half-shaft 107 comprises a cavity which will form the second projecting face of the bosses of the magnetic sheets.

In step 79, the magnetic sheets are inserted between the half-shafts or short-circuit discs in such a way that the locking means are not yet in their shape and final dimensions.

In step 80, tie rods are inserted into the retaining holes of each of the magnetic sheets, then the magnetic sheets are compacted between the half-shafts or short-circuit discs in order to definitively form the locking means comprising bosses and so that the locking means are secured by deformation.

In this step, the second face of each boss is inserted without clearance into the first face of a boss or into a conical hole of an adjacent element in such a way that the magnetic sheet is immobilized during compacting, which finalizes producing the shape and final dimensions of the locking means of the magnetic sheets.

Figure 34:
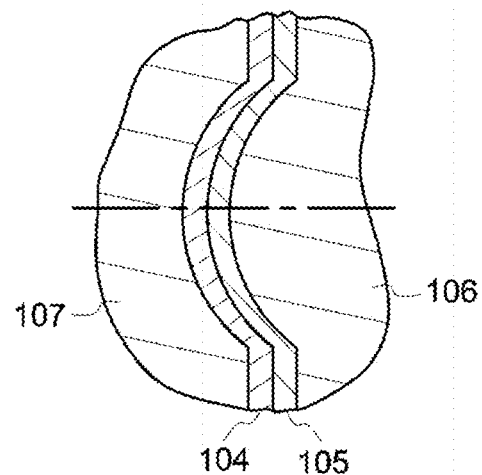
FIG. 34 shows the final configuration of the third embodiment of the rotor.

FIG. 34 shows the end of the forming of the locking means at the end of compacting of the magnetic circuit between the two half-shafts 106 and 107 or between the short-circuit discs which in turn are compacted between the half-shafts.

In this embodiment, each preformed boss has substantially the same diameter or the same peripheral dimension in their final form during compacting, but the final shape thereof will be deeper during compacting.

According to another embodiment not shown, each preformed boss has substantially the same depth in its final shape during compacting, but its final shape will be wider or broader at the surface during compacting, such as for example a circular boss with a larger diameter in its final compacted form than the smaller diameter of said boss preformed in step 77.

The third embodiment is a compromise between the first and the second embodiment, because the radial and/or tangential locking of the magnetic sheets of the rotor is of good quality by cooperation without clearance of the adjacent bosses by deformation during compacting, although without requiring great additional compacting force of the tie rods since the boss is not fully formed as in the second embodiment, but produced more deeply or more broadly starting from a boss preformed by the cutting tool, for example, or by stamping and/or punching during a manufacturing step of the magnetic sheets.

The boss by stamping is preferably produced on substantially at least one time the thickness of the magnetic sheet, preferably on substantially two to three times the thickness of the sheet.

The punching and/or stamping operation, when it is carried out prior to the compacting of the magnetic circuit of the rotor, is preferably carried out individually on each magnetic sheet.

The boss or the locking means is not removed from the magnetic sheet.

It should be noted that there is no method of bonding magnetic sheets.

The boss or the locking means is not eliminated in any step of producing the rotor.

Advantageously, the radial and/or tangential locking means prevent a displacement of the magnetic sheets compacted between two half-shafts of a rotor with a non-through shaft when the rotor is in rotation over the full life thereof, the rotor being more resistant to shocks, vibrations and excess torque.

The magnetic sheets are advantageously maintained when the temperature thereof is greater than the glass transition temperature of the varnish covering said sheets.

The speed of rotation or the temperature of the rotor is no longer limited. Consequently, for an electrical machine of given volume, the electrical power thereof can be increased without modifying its architecture, representing a technical and commercial advantage.

Of course, the rotary electric machine can function in motor or generator mode, can be synchronous, wound-rotor asynchronous or squirrel-cage-rotor asynchronous.

The invention claimed is:

1. A plurality of magnetic sheets for a rotor, each magnetic sheet (i) having a non-through shaft with no recess at the center thereof (ii) being configured for insertion between two half-shafts of the rotor, and (iii) comprising:
at least one locking device comprising (i) a boss having a first face forming a cavity and a second face projecting away from the magnetic sheet opposite the first face and (ii) a hole for accommodating a boss of an adjacent magnetic sheet of the plurality of magnetic sheets;
wherein a second face of a boss of a first magnetic sheet of the plurality of magnetic sheets cooperates with a hole arranged in an adjacent magnetic sheet of the plurality of magnetic sheets, such that the second face of the boss of the first magnetic sheet is inserted into the hole of the adjacent magnetic sheet; and
wherein a clearance separates a first side of the second face of the boss from an edge of the hole, and a second side of the second face of the boss is in contact with the edge of the hole.

2. The plurality of magnetic sheets according to claim 1, further comprising a central portion and a peripheral portion located on an outer periphery of each magnetic sheet of the plurality of magnetic sheets, wherein the central and peripheral portions of each magnetic sheet of the plurality of magnetic sheets form an angle such that the peripheral portion of the first magnetic sheet of the plurality of magnetic sheets cooperates with the peripheral portion of the adjacent magnetic sheet of the plurality of magnetic sheets in order to prevent a radial displacement of the first magnetic sheet relative to the adjacent magnetic sheet.

3. The plurality of magnetic sheets according to claim 2, wherein at least two different locking devices are distributed uniformly over a diameter of each magnetic sheet of the plurality of magnetic sheets.

4. The plurality of magnetic sheets according to claim 3, wherein the at least one locking device is circular, cylindrical, conical or substantially spherical, square, triangular, polygonal or oblong in shape, such that a largest dimension of the locking device is oriented along a radial direction or along a direction perpendicular to a radial direction.

5. The plurality of magnetic sheets according to claim 4, further comprising a plurality of circular retaining holes configured to receive tie rods, a position of the retaining holes and of the at least one locking device on a magnetic sheet of the plurality of magnetic sheets being pre-determined such that during assembly of the plurality of magnetic sheets, each magnetic sheet from a same rolled roll of magnetic sheets is offset by a predetermined angle.

6. A rotor with a non-through shaft for rotary electric machine comprising:
a plurality of magnetic sheets, compacted between two half-shafts connected by tie rods, each magnetic sheet comprising:
at least one locking device comprising (i) a boss having a first face forming a cavity and a second face projecting away from the magnetic sheet opposite the first face and (ii) a hole for accommodating a boss of an adjacent magnetic sheet of the plurality of magnetic sheets;

wherein a second face of a boss of a first magnetic sheet of the plurality of magnetic sheets cooperates with a hole arranged in an adjacent magnetic sheet of the plurality of magnetic sheets, such that the second face of the boss of the first magnetic sheet is inserted into the hole of the adjacent magnetic sheet; and wherein a clearance separates a first side of the second face of the boss from an edge of the hole, and a second side of the second face of the boss is in contact with the edge of the hole.

7. The rotor according to claim 6, wherein the at least one locking device of the first magnetic sheet of the plurality of magnetic sheets, cooperates with the at least one locking device of the adjacent magnetic sheet of the plurality of magnetic sheets in such a way that the first magnetic sheets and the adjacent magnetic sheet are immobilized along a radial and/or tangential direction of the rotor.

8. The rotor according to claim 7, wherein at least one half-shaft of the two half-shafts comprises a central portion comprising at the center thereof a blind hole, a counterbore or a cavity of an angled conical shape.

9. A method of obtaining a plurality of magnetic sheets for a rotor with a non-through shaft with no recess at the center thereof, the method comprising:

inserting the plurality of magnetic sheets between two half-shafts of the rotor, each magnetic sheet comprising: at least one locking device comprising (i) a boss having a first face forming a cavity and a second face projecting away from the magnetic sheet opposite the first face and (ii) a hole for accommodating a boss of an adjacent magnetic sheet of the plurality of magnetic sheets; and coupling a first magnetic sheet of the plurality of magnetic sheets with an adjacent magnetic sheet of the plurality of magnetic sheets, such that a second face of a boss of the first magnetic sheet of the plurality of magnetic sheets cooperates with a hole arranged in the adjacent magnetic sheet of the plurality of magnetic sheets, thereby facilitating an insertion of the second face of the boss of the first magnetic sheet into the hole of the adjacent magnetic sheet;

wherein a clearance separates a first side of the second face of the boss from an edge of the hole, and a second side of the second face of the boss is in contact with the edge of the hole.

10. The method of claim 9, wherein theboss is produced by stamping preferably on a substantially half-thickness of sheet.

11. The method of claim 9, wherein the boss is produced by stamping preferably on substantially at least one time the thickness of the magnetic sheet, preferably on substantially two to three times the thickness of the sheet.

12. The method of claim 9, wherein the plurality of magnetic sheets are bent in order to form a central portion and a peripheral portion located on an outer periphery of each magnetic sheet of the plurality of magnetic sheets, wherein the central portion and the peripheral portion forming an angle such that the peripheral portion of the first magnetic sheet of the plurality of magnetic sheets cooperates with the peripheral portion of the adjacent magnetic sheet of the plurality of magnetic sheets in order to prevent a radial displacement of the first magnetic sheet relative to the adjacent magnetic sheet.

13. The method of claim 12, wherein the at least one locking device is produced when the plurality of magnetic sheets are inserted and compacted between two half-shafts or between two short-circuit discs which are in turn compacted between the half-shafts.

14. The method of claim 12, wherein the at least one locking device is partially produced by preforming in the plurality of magnetic sheets, in which a shape and final dimensions of the at least one locking device is produced during a compacting step when the plurality of magnetic sheets are inserted between two half-shafts or between two short- circuit discs compacted between two half-shafts.

15. The method of claim 12, wherein the plurality of magnetic sheets are inserted between the two half-shafts or two short-circuit discs in such a way that the at least one locking device of each magnetic sheet of the plurality of magnetic sheets cooperate with its adjacent magnetic sheet of the plurality of magnetic sheets so as to immobilize each magnetic sheet of the plurality of magnetic sheets along a radial and/or tangential direction relative to its adjacent magnetic element;

wherein each magnetic sheet of the plurality of magnetic sheets includes at least one locking device intended to cooperate with an adjacent magnetic sheet so as to prevent a relative displacement of the magnetic sheet relative to its adjacent the magnetic sheet.

16. The method of claim 15, wherein a plurality of tie rods are inserted into each magnetic sheet of the plurality of magnetic sheets, and wherein the tie rods (i) pass through a plurality of retaining holes of each of the magnetic sheets of the plurality of magnetic sheets and (ii) connect the two half-shafts in such a way that the plurality of magnetic sheets are held compacted between the two half-shafts.

* * * * *